US012645737B2

(12) United States Patent
Freund et al.

(10) Patent No.: US 12,645,737 B2
(45) Date of Patent: Jun. 2, 2026

(54) FAR-EDGE INTENSIVE PROCESSING FOR SO-MAPS

(71) Applicant: Dell Products L.P., Round Rock, TX (US)

(72) Inventors: Werner Spolidoro Freund, Rio de Janeiro (BR); Julia Drummond Noce, Rio de Janeiro (BR); Pablo Nascimento da Silva, Niterói (BR); Vinicius Michel Gottin, Rio de Janeiro (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 18/049,709

(22) Filed: Oct. 26, 2022

(65) Prior Publication Data

US 2024/0144174 A1     May 2, 2024

(51) Int. Cl.
*G06F 16/901* (2019.01)

(52) U.S. Cl.
CPC ................................ *G06F 16/9024* (2019.01)

(58) Field of Classification Search
CPC .. G06F 16/9024; G06F 16/902; G06F 16/901;
G06F 16/906; G06F 16/90; G06F 16/00
See application file for complete search history.

(56) References Cited

U.S. PATENT DOCUMENTS

| | | | |
|---|---|---|---|
| 7,895,021 B1 | 2/2011 | Andrews, Jr. | |
| 8,261,033 B1 | 9/2012 | Slik et al. | |

| | | | |
|---|---|---|---|
| 10,142,353 B2 | 11/2018 | Yadav et al. | |
| 10,346,654 B2 * | 7/2019 | Hochhalter | H04L 41/0856 |
| 10,429,197 B1 | 10/2019 | Carrino et al. | |
| 10,549,928 B1 * | 2/2020 | Chavez | B65G 47/905 |
| 10,584,971 B1 | 3/2020 | Askeland | |
| 10,878,386 B2 * | 12/2020 | Hoofard | G06Q 10/20 |
| 10,964,097 B2 | 3/2021 | Teply et al. | |
| 11,077,548 B2 * | 8/2021 | Stilwell | B25J 9/1682 |
| 11,157,527 B2 * | 10/2021 | Wang | G06F 16/29 |

(Continued)

FOREIGN PATENT DOCUMENTS

| | | |
|---|---|---|
| CN | 110537078 A | 12/2019 |
| CN | 116368355 A | 6/2023 |
| WO | 2020/112827 A2 | 6/2020 |

OTHER PUBLICATIONS

Hornung, A. et al. (2013) 'OctoMap: An efficient probabilistic 3D mapping framework based on octrees', Autonomous Robots, 34(3), pp. 189-206. doi:10.1007/s10514-012-9321-0.

(Continued)

*Primary Examiner* — Miranda Le
(74) *Attorney, Agent, or Firm* — Workman Nydegger

(57)     ABSTRACT

Systems and methods for decoupling information into multiple levels of detail based on semantics while providing a compact global representation structure. A tree-based graph represents objects in an environment. The top node provides complete environment information at the lowest level of detail. Leaves of the tree-based graph complement the parent nodes with more detailed local information. This achieved efficient processing, communication, and data compaction. Steps for updating the tree-based graph are performed at both a far-edge node and a near-edge node.

18 Claims, 14 Drawing Sheets

(56) References Cited

U.S. PATENT DOCUMENTS

| | | | | |
|---|---|---|---|---|
| 11,227,401 | B1 * | 1/2022 | Mahieu | G01S 17/89 |
| 11,312,379 | B2 * | 4/2022 | Taylor | G01C 21/3841 |
| 11,314,254 | B2 | 4/2022 | Macias et al. | |
| 11,402,830 | B2 * | 8/2022 | Sullivan | G05D 1/0297 |
| 11,436,504 | B1 | 9/2022 | Lukarski et al. | |
| 11,533,234 | B2 * | 12/2022 | Cencini | H04L 67/1012 |
| 11,595,269 | B1 | 2/2023 | Ghosh et al. | |
| 11,792,262 | B1 | 10/2023 | Chung et al. | |
| 11,819,734 | B2 | 11/2023 | Lee et al. | |
| 11,836,563 | B2 * | 12/2023 | Khoche | B65C 9/1869 |
| 2002/0152318 | A1 | 10/2002 | Menon et al. | |
| 2010/0045701 | A1 | 2/2010 | Scott et al. | |
| 2012/0090667 | A1 | 4/2012 | Cap et al. | |
| 2012/0323431 | A1 * | 12/2012 | Wong | G05D 1/0274 |
| | | | | 701/25 |
| 2013/0307720 | A1 | 11/2013 | Lilburn | |
| 2014/0074342 | A1 * | 3/2014 | Wong | G05D 1/0274 |
| | | | | 701/26 |
| 2014/0278517 | A1 | 9/2014 | Patel et al. | |
| 2014/0309841 | A1 * | 10/2014 | Hara | G01S 17/89 |
| | | | | 701/26 |
| 2016/0071278 | A1 * | 3/2016 | Leonard | G06T 7/579 |
| | | | | 348/47 |
| 2016/0292908 | A1 * | 10/2016 | Obert | G06T 15/005 |
| 2016/0314149 | A1 | 10/2016 | Lection et al. | |
| 2016/0359872 | A1 | 12/2016 | Yadav et al. | |
| 2017/0248963 | A1 | 8/2017 | Levinson et al. | |
| 2017/0317920 | A1 * | 11/2017 | Rocquelay | H04L 45/24 |
| 2018/0137390 | A1 | 5/2018 | Brundage et al. | |
| 2018/0137675 | A1 | 5/2018 | Kwant et al. | |
| 2018/0173239 | A1 * | 6/2018 | Yoon | G01S 17/89 |
| 2018/0222043 | A1 | 8/2018 | Trovero et al. | |
| 2019/0043246 | A1 | 2/2019 | Teply et al. | |
| 2019/0163191 | A1 | 5/2019 | Sorin et al. | |
| 2019/0285396 | A1 | 9/2019 | Yao et al. | |
| 2020/0026292 | A1 * | 1/2020 | Douillard | G06T 7/11 |
| 2020/0030965 | A1 | 1/2020 | Stilwell | |
| 2020/0036595 | A1 | 1/2020 | Wallerstein et al. | |
| 2020/0370920 | A1 | 11/2020 | Ahmed et al. | |
| 2021/0021485 | A1 | 1/2021 | Guim et al. | |
| 2021/0107153 | A1 * | 4/2021 | Poornachandran | B25J 13/006 |
| 2021/0140773 | A1 | 5/2021 | Ondruska et al. | |
| 2021/0144517 | A1 | 5/2021 | Guim et al. | |
| 2021/0150771 | A1 | 5/2021 | Huang et al. | |
| 2021/0169417 | A1 | 6/2021 | Burton | |
| 2021/0187391 | A1 | 6/2021 | Ekkati et al. | |
| 2021/0233390 | A1 | 7/2021 | Georgiou et al. | |
| 2021/0302260 | A1 | 9/2021 | Baggs et al. | |
| 2021/0389817 | A1 * | 12/2021 | Spinelli | G06N 5/01 |
| 2022/0082408 | A1 | 3/2022 | Montemerlo et al. | |
| 2022/0129426 | A1 | 4/2022 | Sohail et al. | |
| 2022/0131934 | A1 | 4/2022 | Oku et al. | |
| 2022/0138966 | A1 | 5/2022 | Sung et al. | |
| 2022/0147059 | A1 * | 5/2022 | Borne-Pons | G05D 1/6985 |
| 2022/0147407 | A1 | 5/2022 | Asgar et al. | |
| 2022/0187841 | A1 * | 6/2022 | Ebrahimi Afrouzi | |
| | | | | G05D 1/0274 |
| 2022/0200917 | A1 | 6/2022 | Mortensen et al. | |
| 2022/0203165 | A1 | 6/2022 | Lee et al. | |
| 2022/0204019 | A1 | 6/2022 | Lauterbach et al. | |
| 2022/0245111 | A1 * | 8/2022 | Harrison | G06F 16/2246 |
| 2022/0292068 | A1 | 9/2022 | Lin et al. | |
| 2022/0329650 | A1 | 10/2022 | Zhang et al. | |
| 2022/0413989 | A1 | 12/2022 | Karri et al. | |
| 2023/0005217 | A1 * | 1/2023 | Chen | G06N 20/00 |
| 2023/0071442 | A1 | 3/2023 | Tripathy et al. | |
| 2023/0106877 | A1 | 4/2023 | Simeonov et al. | |
| 2023/0117081 | A1 | 4/2023 | Hunter et al. | |
| 2023/0156074 | A1 | 5/2023 | Kim et al. | |
| 2023/0161041 | A1 | 5/2023 | Schindler et al. | |
| 2023/0213494 | A1 | 7/2023 | Sanden et al. | |
| 2023/0231903 | A1 | 7/2023 | Zeng | |
| 2023/0237064 | A1 | 7/2023 | Bao | |
| 2023/0275834 | A1 | 8/2023 | Huang | |
| 2023/0291794 | A1 | 9/2023 | Bartholomew et al. | |
| 2023/0297356 | A1 | 9/2023 | Hudson | |
| 2023/0376558 | A1 | 11/2023 | Seyfi et al. | |
| 2024/0050803 | A1 | 2/2024 | Lee et al. | |
| 2024/0362808 | A1 | 10/2024 | Del et al. | |

OTHER PUBLICATIONS

Wurm, K.M. et al. (2011) 'Hierarchies of Octrees for Efficient 3D Mapping', (September). doi:10.1109/IROS.2011.6048189.

N. Hubel, A. Gusrialdi, H. Fujita, and O. Sawodny, "Coverage Control with Information Decay in Dynamic Environments," Jan. 2008.

Dahmen et al, "Verification and validation of Digital twins and virtual testbed," International Journal of Advances in Applied sciences, vol. 11, n° 1, 2022.

Errandonea, Itxaro et al., "Digital Twin for Maintenance: A literature review", Computers in Industry 123 103316, Elsevier, Oct. 5, 2020.

Hubel et al., Coverage Control with Information Decay in Dynamic Environments, 2008.

McMahan, Communication-Efficient Learning of Deep Networks from Decentralized Data, version 3, Feb. 28, 2017, Artificial Intelligence and Statistics, pp. 1273-1282.

Tao, Fetal., "Chapter 2—Applications of Digital Twin", Digital Driven Smart Manufacturing, Feb. 15, 2019, pp. 29-62, https://doi. org/10.1016/B978-0-12-817630-6.00002-3.

U.S. Appl. No. 18/049,700, filed Oct. 26, 2022, titled SO-MAP: a Semantic-Aware Algorithm for Optimizing the Representation Structure of Octomaps.

U.S. Appl. No. 18/050,274, filed Oct. 27, 2022, titled Orchestration of Action-Input Representations for Decision Making in Edge Environments.

Seong Jun Kim and Sung Ha Kang and Haomin Zhou, Optimal Sensor Positioning (Osp); A Probability Perspective Study, Apr. 19, 2016, arXiv: 1604.05391 (Year: 2016).

* cited by examiner

700

Verify Multiple Observations from the Same Node 702

Determine Whether Observations are Compatible with an Existing Node 704

Identify and Place the Node in the Map 706

600

Associate Based on Oriented Bounding Boxes 602

Find Nodes with the Same Label 604

Determine OBB of other Nodes 606

Test For OBB Instersections 608

Start at Root Node
1002

Go down one Level in
Depth
1004

All Nodes
Finished?
1006

Get Node Not Sampled
1008

Compute Probability of
Existence
1010

Below
Threshold?
1012

Delete Node and All
Children
1014

Update Nodes
1016

Root
Node Level?
1018

Finished
1020

1000

1400

Memory 1402

NVRAM 1404

Processor 1406

Application(s) 1414

Storage Media 1408

UI Device 1410

Data Storage 1412

FAR-EDGE INTENSIVE PROCESSING FOR SO-MAPS

FIELD OF THE INVENTION

Embodiments of the present invention generally relate to logistics operations. More particularly, at least some embodiments of the invention relate to systems, hardware, software, computer-readable media, and methods for logistics operations, including positioning and mapping operations, for devices or objects operating in environments.

BACKGROUND

A smart environment may include multiple objects operating in the environment. The logistics may be orchestrated at the objects and/or at a central location (e.g., a near-edge or central system). However, there are many scenarios where performing the logistics operations is hindered by resource constraints.

For example, some environments are large in size and include a large number of objects operating therein. These factors contribute to resource constraints. Attempts to resolve these issues include using frameworks such as an OctoMap framework. However, this framework breaks down in edge applications and does not resolve resource constraints.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
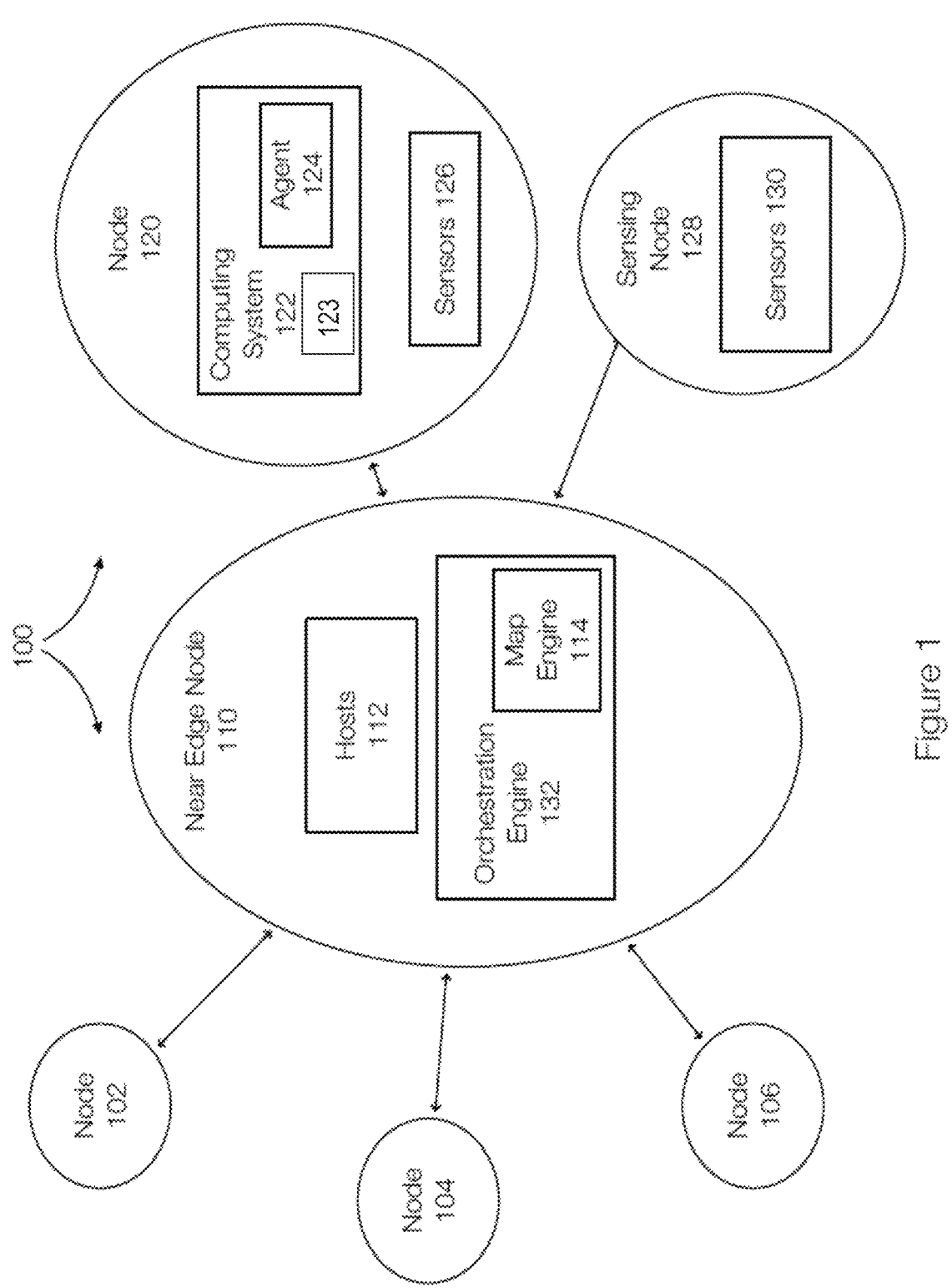
FIG. 1 discloses aspects of an environment in which logistics operations are performed and managed using a tree-based graph.

Embodiments of the present invention generally relate to logistics. More particularly, at least some embodiments of the invention relate to systems, hardware, software, computer-readable media, and methods for logistics operations, which include managing and controlling objects/devices in an environment.

Logistics operations, by way of example, may be performed in environments (e.g., a warehouse) that includes objects such as autonomous robots or forklifts, or other devices. These objects are examples of far-edge nodes (or nodes) that may communicate with a central node (e.g., a near-edge node), which may operate in a cloud or edge environment. The logistics operations, by way of example, may be performed at the central or near-edge node and/or at the far-edge nodes.

Embodiments of the invention facilitate logistics operations using a multi-dimensional map (e.g., a 3D map) that may be stored and updated at the near-edge node. The map is maintained/updated based on information received from the nodes in the environment. Portions of the map may be distributed to the nodes as needed. Based on the global state represented by the global map, the near-edge node may communicate decisions or other information to the nodes.

The near-edge node may include an orchestration or logistics engine that may be configured to determine or compute real-time decisions based, at least in part, on a global state of the dynamic environment represented as a 3D (three-dimensional) map built/maintained in part from data streams received from the nodes. The nodes rely on the near-edge node to provide an updated local map (a portion of the global map) and/or may benefit from the map or a portion thereof to properly interact with the environment.

Embodiments of the invention may represent the nodes in the environment using a tree-based structure that help alleviate resource constraints in the environment. In one example, the environment may be represented using a mapping framework, such as an OctoMap framework. Embodiments of the invention, however, alter and adapt this framework in a manner that, for example, addresses various types of resource constraints. Generally, this type of framework allows an environment to be tessellated or divided into spaces, which are often referred to as voxels.

Embodiments of the invention may represent nodes using a tree-based graph that disperses information to multiple levels of detail based on semantics while providing a compact global representation structure. The top node may provide complete information at a lowest level of detail. The leaves complement the parents with more detailed local information. This leads to more efficient processing, communication, and data compaction by avoiding the need to perform operations on frivolous information.

In one example, the semantics may include a group of terms that are relevant for tasks that may be performed in an environment. Some of the terms may relate to objects operating in the environment. In a warehouse environment, by way of example, the semantics may include terms such as robots, forklift, shelf, goods, pallet, container, box, and/or other terms relevant to the domain or environment.

In one example, the tree-based graph represents objects operating in an environment. More specifically, each node of the graph may correspond to an object in the environment.

Embodiments of the invention may create/maintain/update the graph as information is received from the environment and/or as objects interact with other objects in the environment or simply perform actions in the environment. More generally, the near-edge node may use external information to perform logistics operations including decision making operations. In one example, the roles of objects can be determined semantically, and this information allows the near-edge node to perform decisions on how the nodes in the environment should interact with the environment.

For example, a forklift may correspond to a node in the tree-based graph. Pallets in the environment may also be examples of objects that correspond to nodes in the graph. If a forklift picks up a specific pallet, this interaction between the forklift and the pallet is an example of information that may be reported back to the near-edge node. This allows the near-edge node to update the graph and ensure that the pallet now carried by the forklift is a child node of the node corresponding to the forklift. The goods on the pallet may also be examples of objects and may be represented in the map as child nodes of the pallet. The level of detail at each node in this chain forklift-pallet-goods may vary in level of detail. The detail may be sufficient to allow the corresponding node to perform any relevant functions. For example, the forklift may only need to know that a certain pallet is being moved from one location to another. Information relating to the goods may not be needed for the forklift to perform its functions.

This generally represents the ability of nodes to perform functions without having to rely on or process data that may not be necessary. When determining whether two forklifts are on a collision course, the contents of goods inside boxes on the pallet may not be relevant to the decision. This improves processing performance as certain information is not processed. At the same time, network bandwidth may be conserved by effectively managing how information is distributed between the near-edge node and the nodes in the environment.

This illustrates that graph relationships allow the state of the environment to be known. Thus, in this example, it is known that goods are on a pallet being carried by a particular forklift. When the pallet is deposited in a location, updating the node may sever the parent/child relationship and place the pallet as a child node of a node representing a shelf.

The level of detail at each node may depend on the location of the node in the graph. Compared to lower-level nodes, higher level nodes of the graph may store information about a greater portion of the environment, but at a lower level of detail. The level of detail required at a given level or node may depend on processing requirements and environment semantics.

As previously discussed, the tree-based graph may alleviate several bottlenecks that may otherwise exist for various reasons (e.g., large number of nodes) including resource constraints. Example bottlenecks or issues may include: (1) constraints in processing time at the near-edge node; (2) transient memory limitations at the near-edge node; (3) communication bottleneck from far-edge node to near-edge node; (4) communication bottleneck from near-edge node to far-edge node; (5) extra processing due to fragmented information; and (6) efficiency limited by having a multi-resolution map.

In one example, a tree-based graph or map is built where the top node provides complete environment information at the lowest possible level-of-detail and the leaves complement the parents with more detailed local information. This graph allows logistic operations to be performed.

The high-level pipeline includes the following steps: at a far-edge node: (1) obtain a set of measurements; (2) associate the measurements to a node; (3) create new node if no association is found; (4) update the node; (5) update node parents (optional at the far-edge node); (6) update free space voxels; (7) prune inexistent child nodes; (8) filter information to generate local environmental information that only included data about updated nodes; at a near-edge node: (9) merge the local environmental information with local environmental information received from other far-edge nodes or generated at the near-edge node; and (10) update a global map by updating node parents.

In addition to this graph (or other structure), embodiments of the invention further relate to updating this graph given the resources of a near-edge node and far-edge nodes. Embodiments of the invention enable efficient processing, communication, and data compaction by avoiding operations on frivolous information. The logistics operations disclosed here include creating and maintaining a multi-resolution global state of the environment that is readily available to be provided on-demand and/or processed at the required level-of-detail using semantic information.

Embodiments of the invention thus relate to logistic operations that may be performed in an environment. The logistics operations may relate to the operation of objects in the environment. Generally, objects (or devices) in an environment may be mobile, movable, or stationary. Example objects or devices may include autonomous robots (e.g., forklifts), pallets, pillars, boxes, goods, or the like. The objects may have different computing resources (e.g., processor, memory, networking). For example, an autonomous robot may have processor, memory, and networking. Other devices, such as a pallet, may only include hardware that can be read (e.g., a radio frequency tag—RFID). These objects or devices may be generally referred to as nodes.

The nodes may communicate with a near-edge node, also referred to as a central node. A central node may be implemented in near-edge or edge infrastructure and/or in a cloud environment. A central node has comparatively more computing resources than the far-edge nodes. A central node may have multiple computing devices (e.g., servers, hosts).

FIG. 1 discloses aspects of an environment in which logistics operations may be performed. In FIG. 1, multiple far-edge nodes, represented by the far-edge nodes 102, 104, 106, and 120, may operate in an environment 100. The far-edge nodes may have different functionality, responsibilities, or purposes. The far-edge node 120 is an example of a mobile and/or autonomous node, such as a robot, a forklift, or the like. The far-edge node 120 may have a computing system 122 in which an agent 124 operates and which also includes a map engine 123 whose operation will be explained in more detail to follow.

The agent 124 is configured to communicate with a near edge node 110 and/or other agents. For example, the agent 124 may receive information or data from the near-edge node 110. The data may include mapping information, commands, instructions, decisions, or the like. The information received by the agent 124 may be based on the tree-based graph or map. In one example, the near-edge node 110 may provide information related to a region of interest, which is based in part on a position of the far-edge node 120 in the environment 100. The information provided to the agent 124 may be relevant to that specific region of interest. The region of interest may be defined by a bounding box and multiple objects may be included within the bounds of the bounding box.

The agent 124 may also be configured to receive or collect data from sensors 126. The sensors 126 may be associated with the far-edge node 120 and may generate inertial data, position data, or the like. The sensors 126 of a particular node may depend on the characteristics of the node. For example, if the far-edge node 120 is a forklift, the sensors 126 may include inertial sensors, position sensors, proximity sensors, mast position sensors, load weight sensors, or the like. The agent 124 receives sensor data and transmits the sensor data to the near-edge node 110. In some examples, the agent 124 may include a machine learning model that allows decisions to be performed at the far-edge node 120 using the sensor data and/or information received from the near-edge node 110. In other examples, the near-edge node 110 processes the sensor data to make decisions, generate inferences, or the like, which are then transmitted back to the far-edge node 120. For example, the near-edge node 110 may be able to determine that one robot is on a collision course with another robot. This allows a decision to be sent to at least one of the robots to change its trajectory.

The sensing node 128 may be an example of a movable or of a stationary far-edge node. For example, the sensing node 128 may be a camera that generates a video stream. In essence, the sensors 130 of the sensing node 128 include a camera in this example. The sensing node 128 may be an RFID tag, a microphone, a thermometer, or other sensor that may not require input from a near-edge node to operate. Further, the sensing node 128 may only broadcast data to the near-edge node 110. The sensing node 128 may not have computing resources other than what is necessary to function as a camera. Stated differently, some embodiments of the sensing node 128 do not perform functions and may not need to receive information from the near-edge node 110.

In another example, the sensing node 128 may be a pallet (movable). The sensors 130 of a pallet may include RFID tags so that the position of the pallet can be measured, inertial or other sensors that allow movement of the pallet to be determined and recorded. A pallet may also include inertial sensors that allow movement of the pallet to be detected.

If the far-edge node 120 is a forklift and the sensing node 128 is a pallet, this type of information can be semantically included or represented in the graph or map. For example, if the sensing node 128 (the pallet) is loaded onto the far-edge node 120, the graph may be updated to reflect a parent-child relationship between these two objects. Once the pallet is delivered or placed in a location, this relationship will be updated.

The near-edge node 110 includes hosts 112 (e.g., physical machines, virtual machines, containers) that are configured to process data received from the far-edge nodes 102, 104, 106, 120, and 128 in the environment 100, generate inferences, send instructions (e.g., to implement decisions made at the near-edge node 110), generate mappings, update map or graph information, or the like.

The near-edge node 110 further includes an orchestration engine 132 that is configured to orchestrate the updating of information between the near-edge node 110 an the far-edge nodes 102, 104, 106, 120 and 128 including the generating and/or updating of a mapping framework for modeling the environment 100. The orchestration engine 132 includes a map engine 114 for generating and/or updating the mapping framework. As previously described, the computing system 122 of the far-edge node 120 includes the map engine 123.

In one example, the near-edge node 110 and/or the far-edge node 120 implements a mapping framework that allows the environment 100 to be modeled as a tree-based data structure of regular occupancy grid space representations (voxels). Embodiments further relate to a semantic framework. This framework representations allow environments to be stored and represented in a computationally efficient (e.g., processing, memory) manner. Conventional OctoMaps are not optimized using semantic information.

An example graph (or map) is described. By way of example, a graph G has nodes with a quintuplet form: $n_i = (m_i, t_i, p_i, C_i, l_i)$. For a generic node i, $m_i$ is an OctoMap (by way of example only), $t_i$ is a reference frame of the node (6D transform), $p_i$ is a parent node reference, $C_i$ is a set or references of child nodes, and $l_i$ is a semantic label. Additional information may be added to each node whenever required.

The following functions may be used in the graph G:

Labeling function: $L \rightarrow Z: \mathcal{L}$: where $\mathcal{L}$ is a space of labels;

Association function: $f_A \rightarrow Z:M$, where Z is a space of a set of measurements and M is a space of map nodes and $f_A$ is a compound function that includes L(.);

Spatial relationship function: $r \rightarrow M \times M: \{0,1\}^{m \times m}$, where m is the cardinality of M.

Updating the graph G can be summarized as follows:

Obtain a set of measurements (e.g., sensor data from nodes in the environment);

Use $f_A$ to retrieve a node $n_i$;

If $n_i \neq \varnothing$:

Update information of node $n_i$;

Else:

Use r(.,.) to retrieve possible tree positions and resolve ambiguities by picking deepest possible node;

Create and place new node as its child;

Populate all remaining quintuplet information, particularly with $m_i$ maximum resolution set to a function of $l_i$.

Embodiments of the invention can be adapted to update child nodes where free space is observed, update the node position on the graph, account for multiple nodes associated with the same object, the time of the last node update, or the like.

Embodiments of the invention may use a graph to decouple information into multiple level-of-detail based on semantics while providing a compact global representation. In one example, a top node provides complete environment information at a low level-of-detail. The leaves complement parent nodes with more detailed local information. This provides efficient processing, communication, and data compaction and avoids performing operations on frivolous information. For example, the near-edge node, may perform processing based on the lowest level-of-detail and avoids processing higher level-of-detail that may not be needed.

Figure 2:
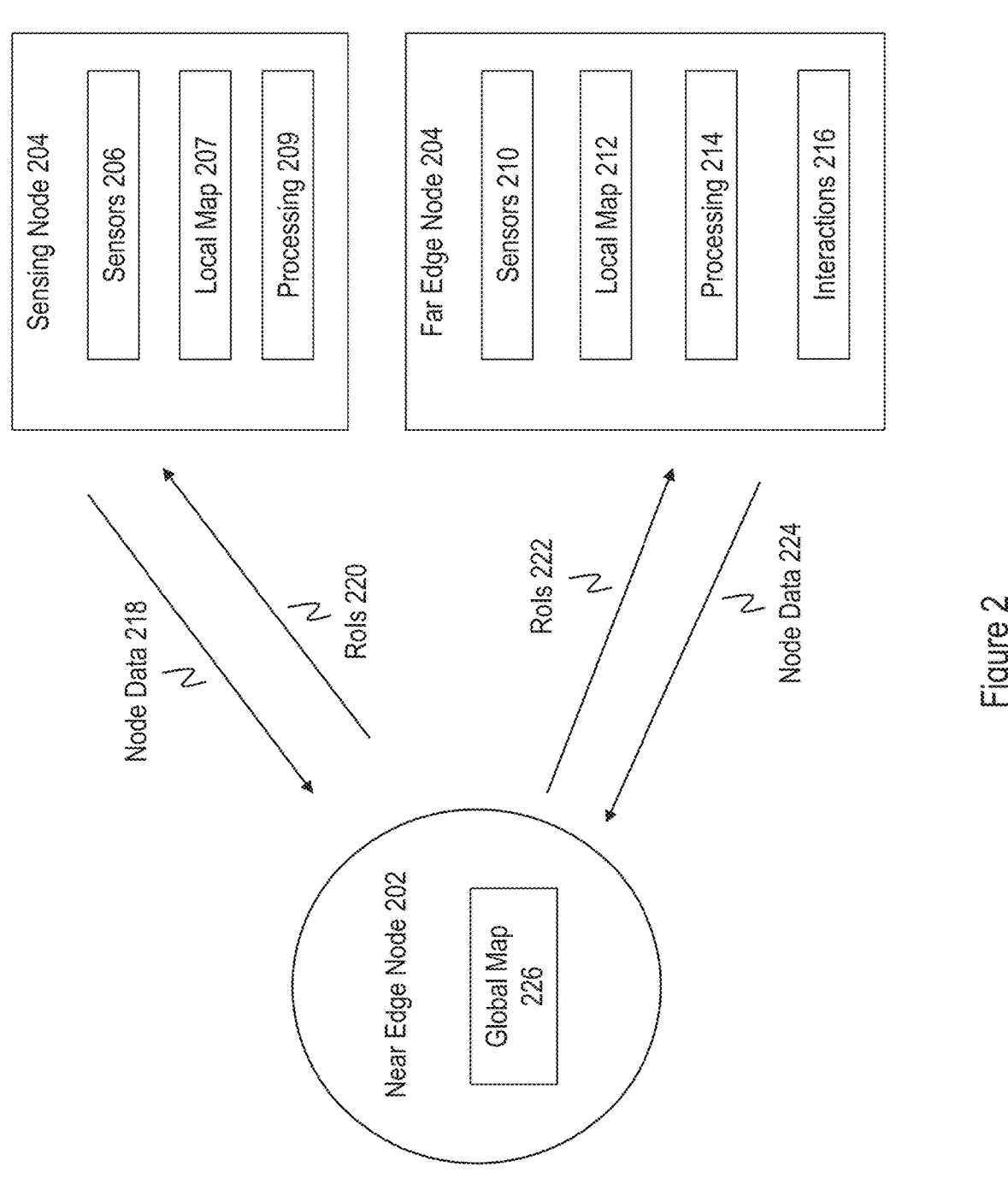
FIG. 2 discloses aspects of a central or near-edge node that uses data and interactions from far-edge nodes in decision making operations.

FIG. 2 discloses aspects of a global map or graph that can be distributed in pieces. FIG. 2 illustrates a near-edge node 202 that communicates with far-edge nodes, represented by sensing nodes 204 and far-edge nodes 208, in an environment. The sensing nodes 204 may be, by way of example only, movable or stationary and may include sensors 206. In a warehouse environment, pallets, boxes, goods, shelves, corners, doors, entries/exits, other structural features (e.g., walls, corners) may be examples of the sensing nodes 204 that provide information to the near-edge node. For example, a door may be a sensing node when configured to convey information such as open or shut. These sensing nodes 204 may include or be associated with sensors 206 such as cameras, open/shut sensor, state, directional sensors, microphones, or the like or combination thereof. Some of the sensing nodes 204 may only generate data streams that are provided to the near-edge node 202. Others of the sensing nodes 204 may have sensors that can be read (e.g., RFID tags) by one or more RFID readers such that data such as position can be determined at the near-edge node 202. The sensors 206 may be domain dependent. In some embodiments, the sensing nodes 204 (or at least some of the sensing nodes) may also include a local map 207 and processing resources 209.

The far-edge nodes 208 may also include sensors 210 and processing resources 214. This allows the far-edge nodes 208 to perform various functions. For example, data from the sensors 210 may be at least partially processed at the far-edge nodes 208. The far-edge nodes 208 may be capable of performing decisions locally.

Generally, node data 218 from the sensors 206 and node data 224 from the far-edge nodes 208 is transmitted to the near-edge node 202. The comparatively more powerful computing resources allows the near-edge node 202 to process the node data 218, 224 at least in the context of performing logistics operations. The node data 218, 224 allow the near-edge node 202 to make decisions that can be transmitted back to the far-edge nodes 208 and to the sensing nodes 204 as appropriate or needed. This allows actions or functions of the far-edge nodes 208 and/or the sensing nodes 204 to be controlled or initiated remotely. For example, the node data 224 may indicate that a collision is likely to occur. The near-edge node 202 may send an instruction to stop movement or other remedial action to one or more specific nodes. More generally, using the node data 218 and 224, the near-edge node 202 can perform decisions on how the objects or nodes interact with the environment.

The node data 224 from the nodes 208 may also include interactions 216. Interactions 216 may include opening a door, moving a pallet, positioning an object, turning a corner, raising a mast, or the like. The interactions 216 can include interactions by the nodes individually or may include multiple nodes. This information can be used when updating the nodes in the graph.

When the near-edge node 202 is making decisions, inferences, or the like, the near-edge node 202 may rely on external information such as the node data 218, 224 and interactions 216.

The near-edge node 202 is associated with a global map 226 (e.g., a tree-based graph). The global map 226 represents objects (nodes) in the environment. Each node of the graph may include an octomap. The nodes, which may each represent an object, in the global map may be semantically related or semantically processed. The nodes 208 are each associated with a local map 212. The local map of one node may be different from the map of another node in the environment. Portions of the global map 226 are distributed as the local maps to the various nodes and using the graph framework. Further, the local maps 212 may have higher resolution in some examples.

More specifically, a tree-based graph is built where the top node provides complete environment information at the lowest possible level-of-detail (e.g., the global map 226) and the leaves complement the parents with more detailed local information (e.g., the local map 212). Hence, it provides efficient processing, communication, and data compaction by avoiding carrying out operations on frivolous information.

As illustrated in FIG. 2, the node data 218 and 224 may include data from sensors 206 and 210 and interactions 216. The near-edge node 202 may deliver Regions of Interest (RoIs) 220 and 222 when applicable to the various nodes

204, 208. In one example, the RoIs may be location based. When sending an RoI to a node, the information within the RoI can be provided at the level-of-detail needed to improve the far-edge performance as a function of the semantics. For example, for navigation purposes, the root node level of detail may suffice to inform the far-edge node that there is a dynamic object on a blind spot so that the node can be more cautious. In the context of object manipulation, observations of other nodes can enhance the precision of the representation of the object. Thus, the RoI may include information relevant to the receiving node and which may originate at other nearby nodes.

The near-edge node 202 can use semantics to mitigate the upload (near to far-edge) rate required to improve far-edge node performance. The near-edge node 202 can use the global map semantics, decisions, far-edge node positions, and actioning statuses to identify from which far-edge nodes to download local observations. This downloaded information may be used in generating the RoI ultimately delivered to a recipient node. Further, the graph can be traversed to provide object positions, last time of update, semantics, and oriented bounding boxes, which allows the graph to provide an orchestration or logistics engine with information to make decisions.

The near-edge node 202 may also depend on external information (e.g., the node data 218, 224, interactions 216) to perform decision making and other logistics operations. The external information may be generated by sensors such as, but not limited to, cameras, depth sensors, LiDARS, RFID readers, motion sensors, or the like or combination thereof. Individual sensors, in general, cannot provide a complete observation of the environment. Further, sensing or static nodes may only provide environmental information and do not require decisions from the near-edge node.

The node data 218, and 224 may be processed at the nodes or provided in a raw form. Thus, sensing nodes 204 may have some processing resources 209 and may have their own local maps 207 for efficiency. This allows sensing nodes 204 to be viewed similar to the far-edge nodes 208. However, some of the sensing nodes 204 may not interact with the environment in a manner that requires decisions from the near-edge node 202.

The near-edge node 202 is configured to build/update/maintain the global map 226 using the node data 218, 224 and the interactions 216. The global map 226 can be used to make decisions.

Figure 3:
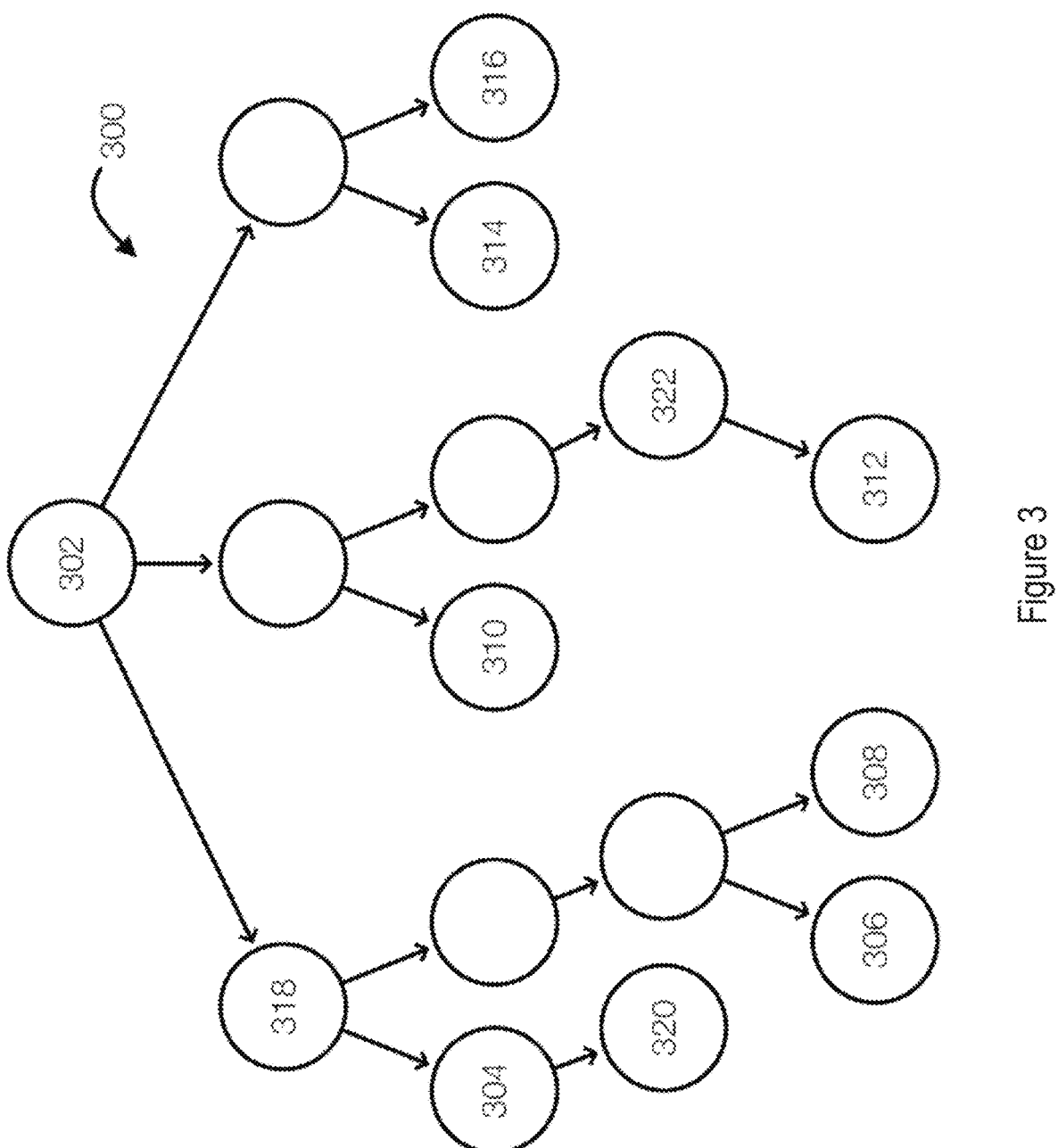
FIG. 3 discloses aspects of a global map.

FIG. 3 illustrates an example of a graph. The graph 300 may or may not have aspects of an octree hierarchy. Embodiments of the invention relate to a graph or map that, while related, builds and expands on the octree hierarchy.

The graph 300 includes a node 302. The node 302 is a lowest depth node of the graph 300 and the leaf nodes 320, 306, 308, 310, and 312 refer to nodes without children nodes. The depth d of the graph 300 can be arbitrarily large. The relationships of objects in an environment may vary and change continually. However, the graph 300 allows information to be received and distributed efficiently and in a manner that better utilizes available resources at the near-edge and far-edge nodes.

As previously stated, a node may have a quintuplet form such as $n_i = (m_i, t_i, p_i, C_i, l_i)$. The root node 302 may be $n_0 = (m_0, t_0, p_0 = \varnothing, C_0 = \{n_i | p_i = n_0\}, l_0 = \varnothing)$.

The node 318 may be represented by $n_1 = (m_1, t_1, p_1 = n_0, C_0 = \{n_i | p_i = n_1, l_1 = \text{shelf}\})$. This demonstrates that the graph 300 includes a semantic aspect and illustrates that, in some embodiments, each node may correspond to a specific device or object in the environment. This allows relationships to be reflected in the graph 300 semantically. For example, the label $l_2$ of the node 304 may be shelf. Because the node 304 is a child of the node 318, this may reflect a relationship between the pallet and the shelf. In other words, the pallet is on the shelf. The label $l_3$ of the node 320 may be goods. This may reflect that the goods of the node 320 are on the pallet 304, which is on the shelf 318.

In another example, the label may also represent an interaction. For example, the label of the node 322 may be open box and the label of the node 312 may be goods. This may indicate that the box containing the goods is or has been opened. This may be a decision that was decided by the near-edge node and provided to an object or node that then opened the box. Opening the box is also an example of an interaction that may be reported back to the near-edge node. Opening the box may be performed in response to an instruction of decision and may also be reported as an interaction.

Figure 4:
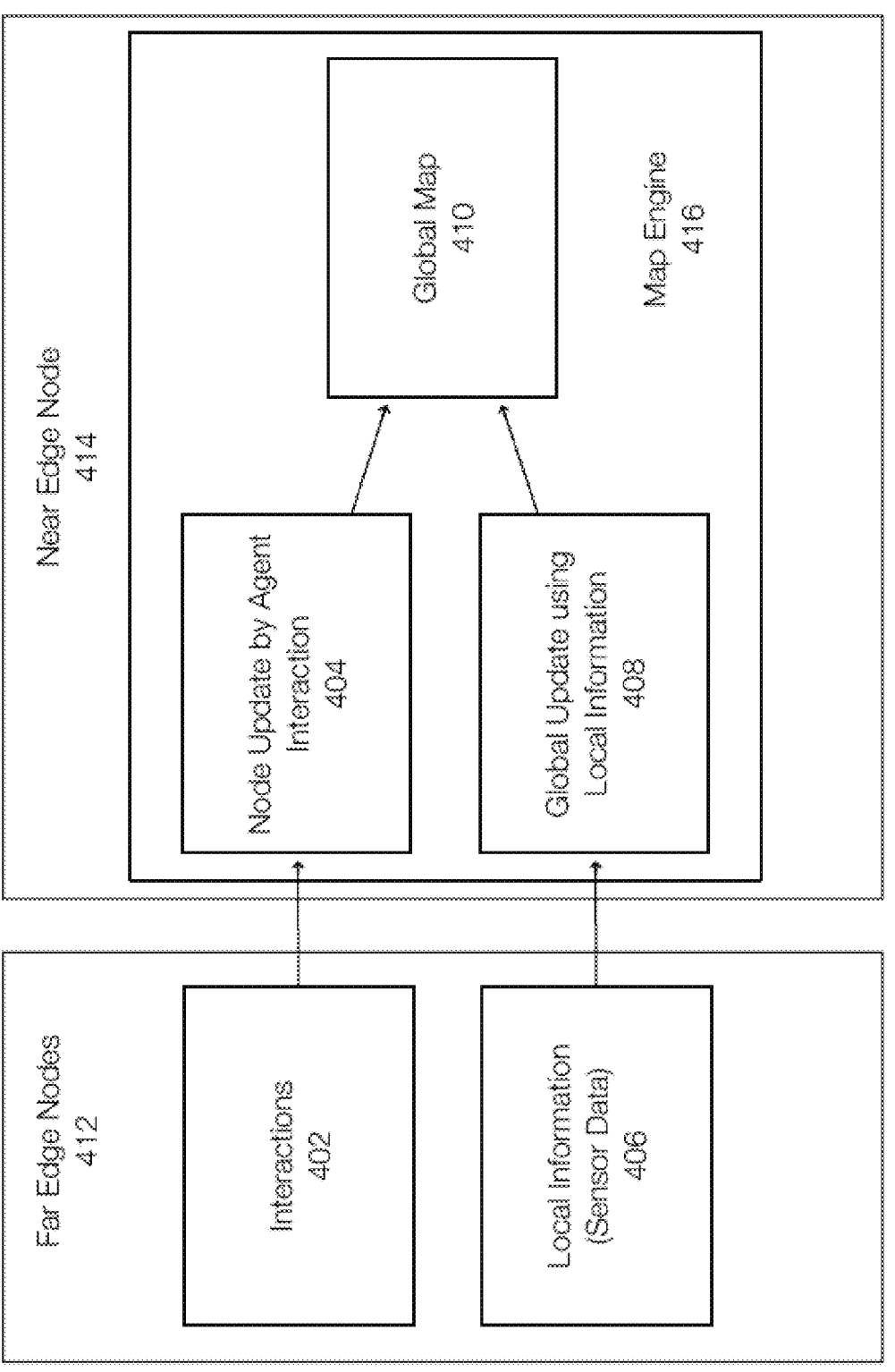
FIG. 4 discloses aspects of updating a global map and/or local maps.

FIG. 4 discloses aspects of graph operations including updating a graph. Once a tree or graph is created, such as the global map 410, the information generated in or collected from the environment may be used to maintain or update the global map 410.

The near-edge node 414 receives inputs (node information) including interactions 402 and local information (e.g., sensor data) 406 from the far-edge nodes 412. The near-edge node 414 includes a map engine 416 that updates the global map 410 using the received node information. A node update is performed by agent interaction 404 and using local information 408. More specifically, a node may perform an action or interact with the environment. This update may or may not be specific to the node. Thus, the interactions may lead to updating a specific node in the map 410. However, the node information may also impact other nodes and result in corresponding updates. The local information 406 may be used to update the nodes in the global map 410.

For example, a far-edge node may report to be carrying a node $n_i$ (an interaction). This information indicates that the node $n_i$ is thus a child node of that agent (the reporting far-edge node) and the global map or graph requires updating to reflect this parent-child relationship. Alternatively, the far-edge node may report to have placed the node $n_i$ at some position (interaction). Thus, the global map is updated by removing the node $n_i$ from that agent (parent node) and the location of the node $n_i$ in the global map is then determined and the node is place accordingly. The sensor data may detect the presence of an object in the environment (a person walking therein). This sensor data may be used to update relevant nodes and/or issue instructions (e.g., avoid collisions with the person).

Embodiments of the invention allow measurements to be processed in the edge environment. Embodiments of the invention allow a near-edge node to provide a part of the global state to an agent operating on a node. The local update to a local map improves/optimizes the agent's performance by providing the agent (the node) with relevant up-to-date global information. The information within or associated local update can be provided at the level-of-detail required to improve the far-edge performance as a function of the semantics.

The far-edge nodes may have limited processing resources and may not be able to execute part of the global map processing. Data streams generated at the far-edge nodes may be processed where possible prior to download to the near-edge node. Because the near-edge node collects or receives information from multiple nodes, the near-edge node can provide partial information of the global state (e.g., a 3D region or region of interest (RoI)) back to the agents on the nodes. The RoIs optimize the agent's performance by providing access to up-to-date global information.

The information within the RoI can be provided at the level of detail required to improve performance of the far-edge nodes as a function of the semantics. For example, for navigation purposes, the root node level-of-detail may suffice to inform the far-edge node that there is a dynamic object on a blind-spot so that the far-edge can be more cautious in such situations. Another possibility is object manipulation, where observations of other far-edge nodes can enhance the precision of the representation of the object.

Regarding when the RoI is provided, one option is for the far-edge node to require such information on-demand. Another option is for the near-edge node to define when the RoI is provided by leveraging on the far-edge node informed status and position. By leveraging on semantics, it is possible to mitigate the upload (near to far-edge node) rate required to improve the far-edge node performance.

The near-edge node can use the global map semantics, its decision, the far-edge node positions, and actioning statuses to identify from which far-edge nodes to download local observations. The graph can be efficiently traversed to provide the object positions, last time of update, semantics, and oriented bounding boxes, hence allowing to efficiently feed an orchestration algorithm with proper information to make its decisions. Embodiments may evaluate a quality of information from a node or employ other operations, such as ray casting, to predict how useful the observation of a sensing node can be.

In addition to processing measurements or observations at the near-edge or central node, measurements or observations may also be processed at the far-edge nodes. For example, data may be compressed prior to transmission to the near-edge node. However, these techniques require compute resources, and the processing/resource constraints of the nodes should be considered before employing these techniques.

Regarding a global update using local information, the graph G may be adapted with a sextuplet form such as $n_i=(m_i, t_i, p_i, C_i, l_i, u_i)$. The term $u_i$ may be the last time the node $n_i$ was updated.

Figure 5:
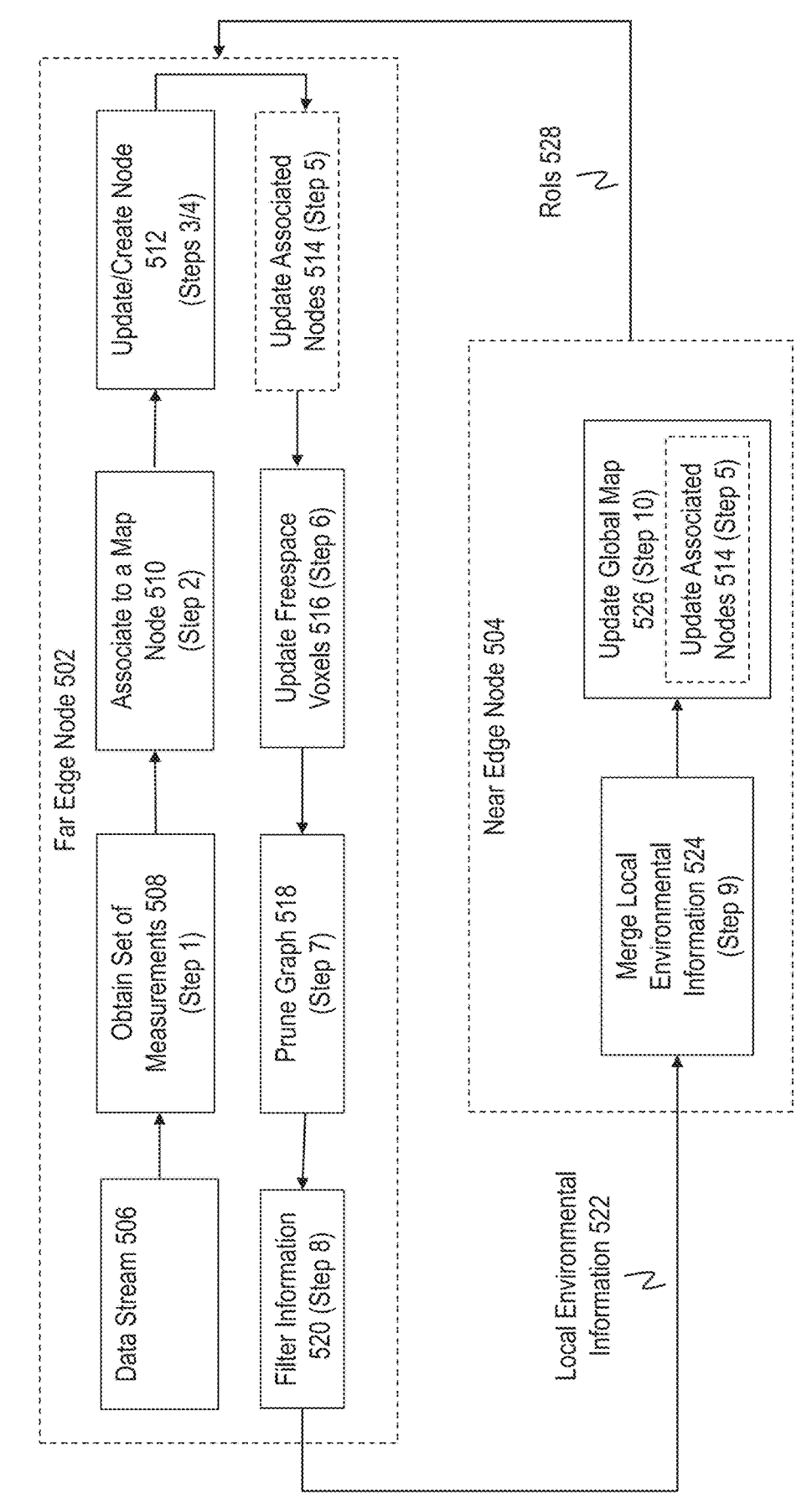
FIG. 5 discloses aspects of updating a global map by performing steps at both a far-edge node and a near-edge node.

FIG. 5 disclose aspects of logistics operations including map management operations, which may include updating a map such as a graph or tree that are performed partially at a far-edge node 502, which may correspond to the other far-edge nodes previously discussed, and partially at a near-edge node 504 which may correspond to the other near-edge nodes previously discussed. In particular, a method or process flow 500 is shown, with FIG. 5 showing where each method step (i.e., method steps 1-10) is performed. After discussing FIG. 5, FIGS. 6-10, which describe aspects of the method 500 in more detail are discussed. It will be appreciated that FIG. 5 shows that the processing resources (i.e., processing resources 214) of the far-edge node 502 are utilized to perform many of the method steps of the method 500. This advantageously moves some of the processing burden from the near-edge node 504 so that the processing resources of the near-edge node 504 are freed up for other tasks such as updating the global map.

In the method 500, measurements are obtained 508 at the far-edge node 502. Node information from one or more nodes (or sensors) is an example of a set of measurements. Each sensor may generate a data stream 506 (e.g., part of the set of measurements). The raw sensor data is processed by the far-edge node 502. This may include, for example, normalizing the data, grouping the data into sets, or other functions that may depend on the application and/or compute resources available at the far-edge node 502. Other processing that may be performed at the far-edge node include compressing the data, sampling the data and sending samples only.

In one example, obtaining 508 a set of measurements may include processing data points. The processing depends on the sensor type providing the measurements. For example, LiDAR feeds can be grouped into segments, camera feeds can have its pixels segmented accordingly to semantic, or the like. Likewise, it is possible to process several sensor feeds when performing intensive processing on the near-edge node. For instance, nearby point clouds can be merged before performing segmentation, which may allow more precise results. These operations are application specific but can be assumed to be performed efficiently.

Once the data measurements are obtained, the measurements or other data are associated 510 to a node in the graph or tree. In some instances, data may be shared with multiple nodes. Data or measurements may be associated with a node using an association function $f_A$.

When associating the set of measurements, also referred to as observations, to a node, the method 500 may create or update 512 a node. If no node is associated, a node is created and placed in the tree. In one example, a list of nodes evaluated is generated. If a node is found, the node is updated.

Next, the associated nodes are updated 514. This may include updating a child node and/or parent nodes in the map. In some embodiments, this method step is optional as it may be performed as part of a step 526 of updating the global map. Method step 514 is shown with dashed lines to indicate that it is optional. If method step 514 is not performed at the far-edge node 502, then the method moves from method step 512 to method step 516.

With regard to the OctoMaps in the nodes, the OctoMaps, including freespace voxels, may be updated 516. Nodes whose probability of existence is lower than a threshold are pruned 518 from the graph. Information is filtered 520 so as to generate local environmental information that only includes information about updated nodes. Since redundant information is removed, when the local environmental information is sent to the near-edge node 504, the use of communication bandwidth is reduced.

Next, the local environmental information 522 from the far-edge node 502 is provided to the near-edge node 504. The local environmental information 522 is merged 524 with location environmental information from other far-edge nodes. In one example, a list of updated nodes is generated. Finally, the global map is updated 526. In some embodiments, updating the global map includes using the method step 512 on the global map. RoIs 528 can then be provided to the far-edge node 502 so that it can update its local map with information from other far-edge nodes.

Figures 6, 7:
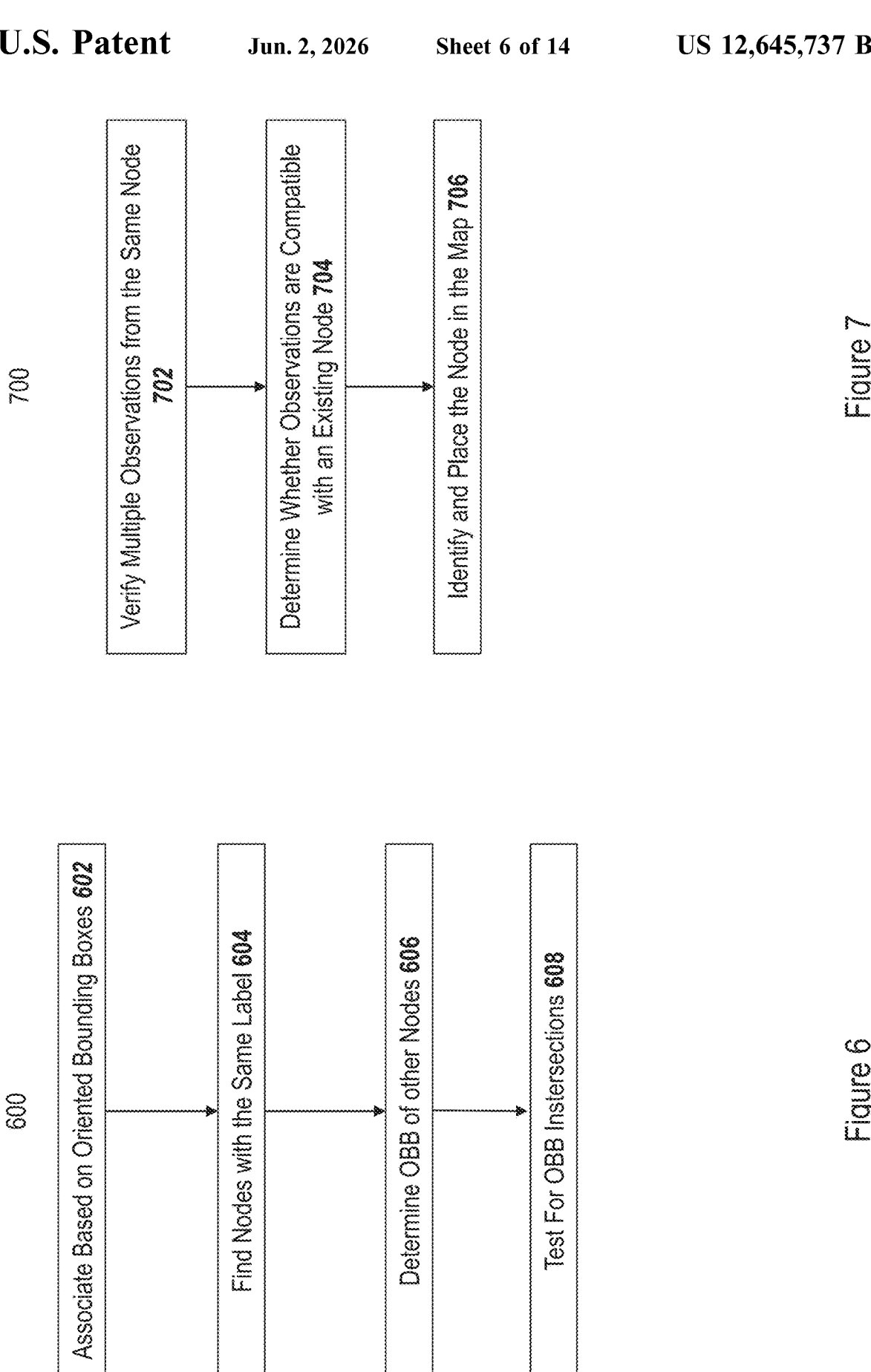
FIG. 6 discloses aspects of associating measurements to nodes.
FIG. 7 discloses aspects of creating/updating nodes.

FIG. 6 discloses aspects of an example association function, such as performed in method step 510 in FIG. 5. In the method 600, data may be associated 602 to nodes using oriented bounding boxes. An oriented bounding box, in one example, may be viewed as a parallelepiped that may include a node and a portion of the environment. The form of the association function $f_A$ is arbitrary. A possible embodiment can rely on data-based methods for object detection or scene analysis techniques to account for the knowledge carried out by the previous measurements and to correct possible mistakes due to partial observations. For instance, each observation may be tested to each node with a compatible oriented bounding box and $f_A$ would return the node with highest likelihood that the observation is part of that node. A similar embodiment could be used to define the form of L and, provided that they share common factors of variation, a multi-task approach can be used to share knowledge between $f_A$ and L, allowing to improve the estimate of the semantics label $l_i$ and to tackle both tasks at once in 604.

Nodes with the same label are identified 604 and the oriented bounding boxes for other nodes may be determined 606. The method 600 may test for OBB intersections 608 with regard to the oriented bounding boxes. Ultimately, the method 600 then returns or identifies the most likely node for the measured data or observations.

A minimum $f_A$ likelihood threshold may be defined to allow observations due to new objects to be associated with their own nodes. Further, identifying the node may also include updating aspects of the nodes, such as some properties of the nodes' quintuplet (e.g., its label, reference frame, and parent node).

FIG. 7 discloses aspects of updating/creating a node in a graph, such as performed in method step 512 in FIG. 5. Generally, a node is created when the observations suggest that the object is not represented in the graph and is, in effect, a new node. In one example, a node is created when a node cannot be located to update. When creating a new node on the graph (e.g., a new node $n_i$ on hierarchy M), embodiments of the invention determine where to place the node in the map or tree.

In the method 700, a verification 702 is performed to ensure that the observations (e.g., the set of measurements) are from the same node. This process of creating a new node is a combinatorial problem and embodiments of the invention may rely on heuristic rules to eliminate unlikely combinations. For example, the method may consider the size, bounding boxes, and general shapes of each semantic. This enables a data driven method for each semantic to feed with the observations. This allows the observations or set of measurements that are from the same node to be identified. For example, sensor readings of mast height, combined with position data, may indicate that the measurements are from a forklift in a particular area.

Next, the method 700 determines 704 whether the observations are compatible with a node already available in the map or tree. In one example, records are kept regarding unobserved changes in nodes. For example, changes in objects performed by external agents may have been performed in a manner that was not tracked in the map or tree updating operations. Depending on the application, one embodiment may use heuristics. For example, RFID tags can be used to identify the object. Thus, the measurements may come from a particular node and the RFID tag may identify the node in the map. In another example, computer vision methods can be used. If the observations are compatible with a known node, its position is updated.

The method then identifies and places 706 the node in the map or tree (e.g., r(.,.)) plays a central role in this task. During the node creation/update operation 512, properties of the quintuplet (or sextuplet) may be generated or created.

Once the node creation/update operation has been performed, associated nodes are updated, such as performed in method step 514 in FIG. 5. As mentioned previously, in some embodiments this step may be optional at the far-edge node 502 and may be performed at the near-edge node 504 during method step 526 or it may be performed at both the far-edge node and the near-edge node.

Figure 8:
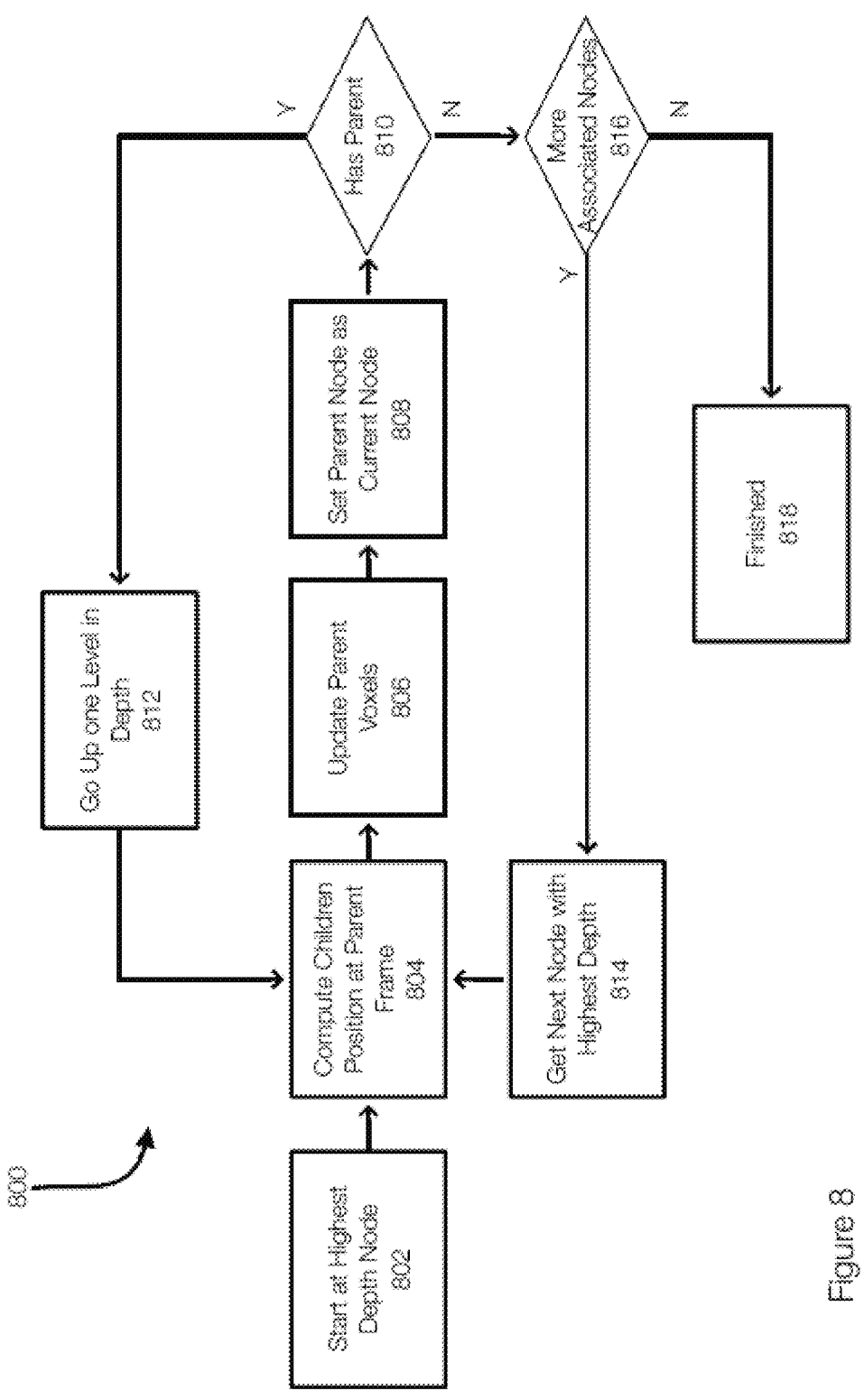
FIG. 8 discloses aspects of updating associated nodes.

FIG. 8 discloses aspects of updating associated nodes, such as performed in method step 514 in FIG. 5. Associated nodes may include child and/or parent nodes. Generally, updating associated nodes include updating properties $u_i$ and $m_i$ and/or other properties. The property $u_i$ is set to a current time of execution of the node update. With regard to updating the property $m_i$, this may include distributing the observations to nodes based on the map as a local map update. Thus, the local OctoMaps are updated.

A core aspect of this invention is the update the parents of each associated node so that they present the actual observed state of the environment, particularly the root node. The update is carried out in a bottom-up approach, starting at the $l_A$ nodes with highest depth. This update keeps the correct level-of-detail for each semantic in the parent nodes. If a parent node has higher detail than a child node, the parent may represent the child with its own details. Otherwise, the child will be represented with lower detail on the parent node.

More specifically, the method 800 starts 802 updating at a highest depth node. Next, the positions of children are determined 804 at the parent frame using $t_i$ (the reference frame of the node). Parent voxels are updated next 806. The parent node is then set 808 as the current node. If the current node has a parent (current node has a parent (Y at 810), go up one level in depth 812 and repeat the method. If the current node does not have a parent (N at 810) and there are more associated nodes (Y at 816), the node at the next highest depth is obtained 814 and the method returns to 804. Otherwise, the method 800 finished 818.

When sets of measurements are received, these measurements or observations provide information related to both free and occupied space. Updating free and occupied space on a local map corresponds to a fraction of the knowledge obtained in an observation. However, free space observations may span beyond the boundaries of the node associated with the observed points regarding occupied space. In one example, free space voxels are updated at nodes using a top-down approach. Generally, starting at the root node, a ray casting operation may be performed to update free space voxels.

Figure 9:
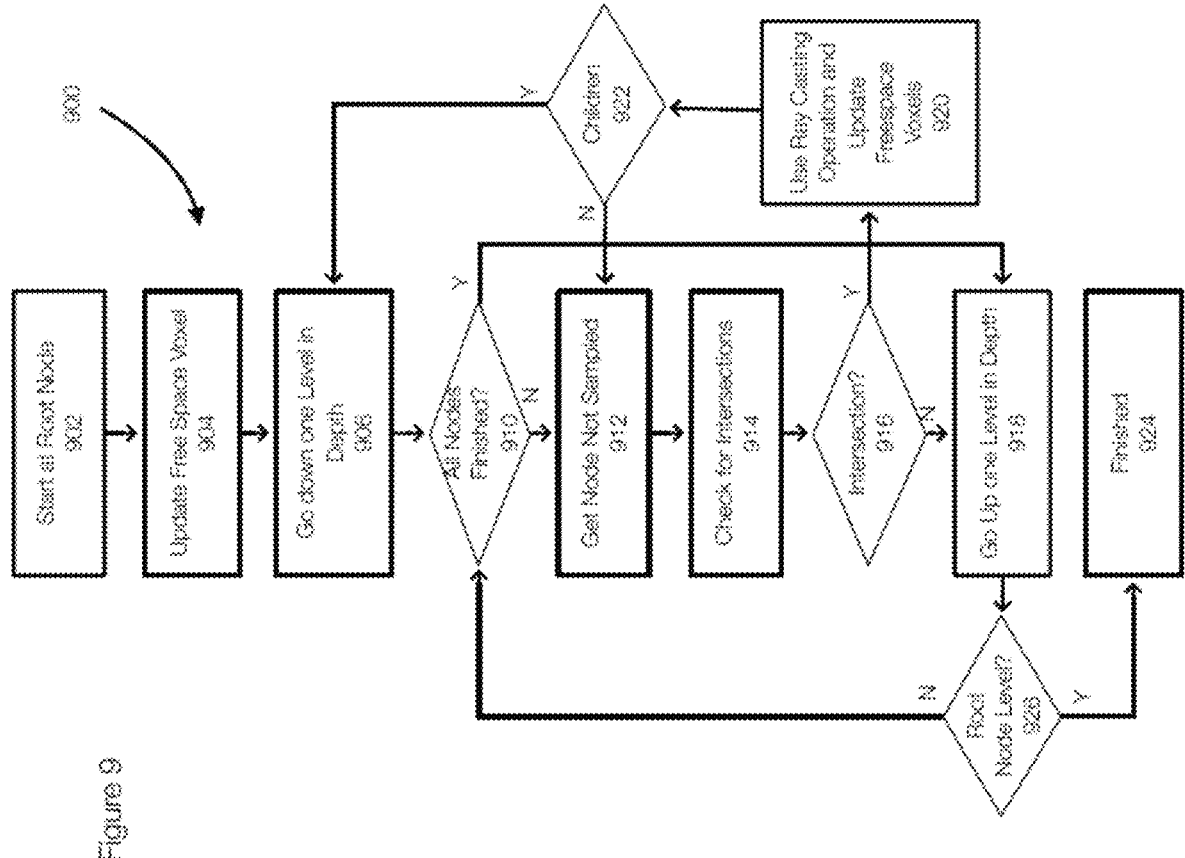
FIG. 9 discloses aspects of updating other nodes.

FIG. 9 discloses aspects of updating other nodes, such as performed in method step 516 in FIG. 5. The measurement may provide information related to both free and occupied space. FIG. 9 is a method for updating only free space voxels at nodes affected by the observation in a top-down approach. The method 900 starts 902 at a root node. Using ray casting or other method, free space voxels are updated 904 for the node.

The method 900 then goes down 906 one level in depth. Next, a node that was not sampled with respect to updating the nodes is retrieved 912 and the retrieved node is checked 914 for intersections of ray casting and oriented bounding box. If there is an intersection (Y at 916), ray casting 920 is performed to update freespace voxels. If there are children nodes (Y at 922), the method 900 goes down one level in depth 906. If there are no children nodes (N at 922), another node that was not previously sampled is retrieved and a similar process of checking 914 for intersections is performed.

If there is no intersection (N at 916), the method goes up one level in depth 918. If at the root node level (Y at 926), the method 900 finished 924. If not (N at 926), the method repeats back to 910. This method 900 updates freespace voxels throughout the full tree structure of the graph for nodes that are not nodes previously sampled or updated in 508.

Figure 10:
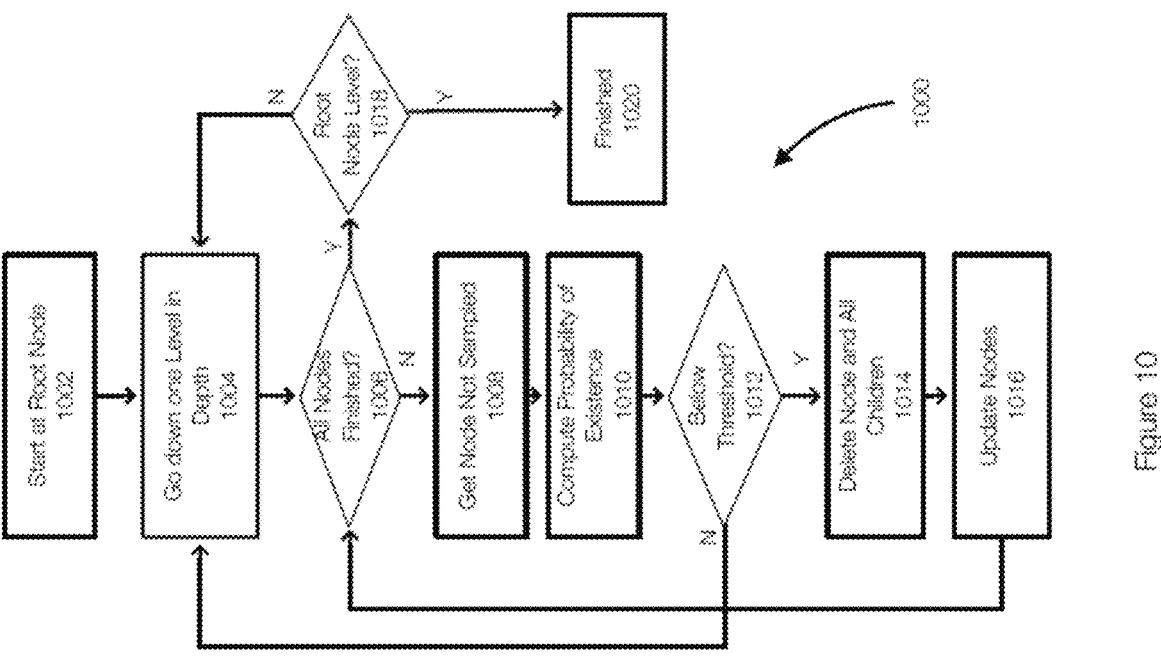
FIG. 10 discloses aspects of pruning nodes in the map.

FIG. 10 discloses aspects of pruning nodes from the graph, such as performed in method step 518 in FIG. 5. Unobserved changes in environment may require the ability to completely remove objects from the representation of the global state. Because all nodes are updated with their children information, a top-down approach may be performed to prune nodes from the graph.

The method 1000 starts 1002 at the root node. After going down 1004 one level in depth and determining that all nodes have not been processed (N at 1006), a node that was not sampled in the context of updating/creating nodes is retrieved or accessed in 1008. The probability of existence is then determined 1010. If below a threshold (Y at 1012), the node and all children are deleted 1014 and the nodes are updated 1016 as needed. The method then returns to 1006 to determine whether all nodes have been processed.

If the existence of a node is not below a threshold (N at 1012), the method 1000 goes down 1004 a level in depth and continues the method. When all nodes are processed (Y at 1006) and the method is at the at the root node level (Y at 1018), the method ends. Otherwise, the method 1000 goes down a level in depth 1004 and continues as discussed.

As previously discussed, the method 500 includes a method step of filtering 520 valuable information to be communicated to the near-edge node 504. This method step helps to avoid the communication of redundant information by only transmitting information about child nodes with updates. The filtering includes not only the associated nodes, but also those nodes updated during method steps 516 and 518. That is, those nodes containing new free space probabilities or that have been pruned will have updates that can be communicated to the near-edge node. Those nodes not having any updates are not communicated, thus saving on communication bandwidth between the far-edge node 502 and the near-edge node 504 as information that would not be useful in updating the global map is not sent. The filtered information is communicated to the near-edge node as local environment information 522.

As previously discussed, the method 500 includes merging 524 at the near-edge node the local environmental information from the far-edge node 502 with local environmental information received from multiple far-edge nodes. This method step handles the observations of the same local environment by the multiple far-edge nodes. Depending on the application, it is possible to rely on simple statistics to resolve inconsistencies between the local environmental information of different far-edge nodes, e.g., mode, average, max, min. More sophisticated heuristics considering semantics can also be defined, e.g., define statistics per semantic group or learn the appropriated statistics using data per semantic group. The segmentation of the local environmental information into nodes allows merging the information to be performed efficiently. By considering the agents position, the system can define semaphores to wait only for information from nearby agents before merging the information from a child node. All child nodes updated during this step are tracked in a global list of nodes $l_U$.

As previously discussed, the method 500 includes updating 526 the global map. In the method step, the near-edge node takes the global list of nodes $l_U$ and uses this list in the update process. In some embodiments, the update process comprises or at least includes the method step 514. That is, the parents of child nodes are recursively updated in the global map using the method step 514. The relevant information from the updated global map can then be provided to the far-edge node 502 and the other far-edge nodes as RoIs 528 so that the far-edge nodes can update their local maps (i.e., local maps 212) as needed.

Figure 11:
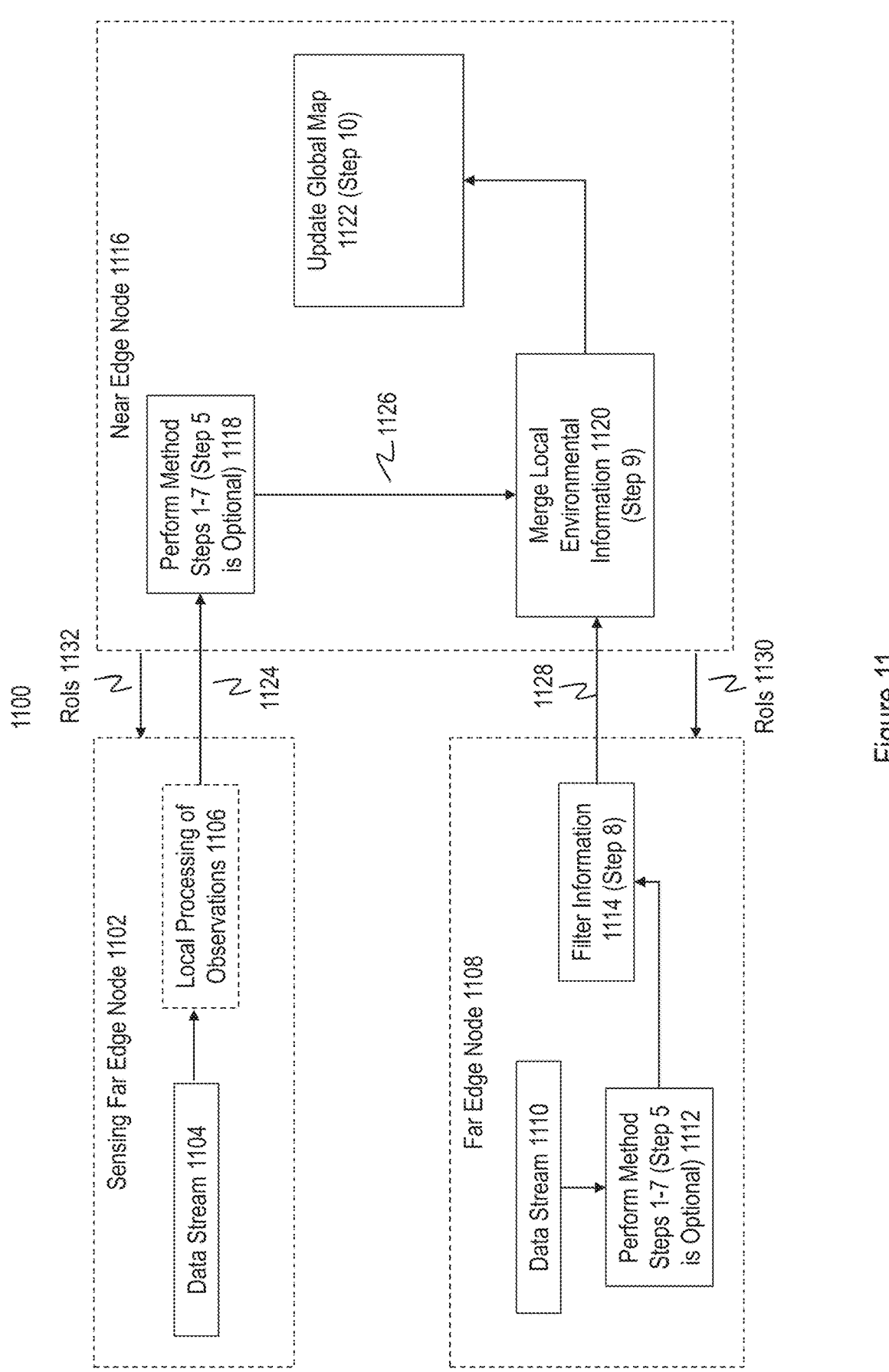
FIG. 11 discloses aspects of updating a global map by performing steps in a hybrid processing manner.

FIG. 11 disclose aspects of logistics operations including map management operations, which may include updating a map such as a graph or tree. In particular, a method or process flow 1100 is illustrated. The method 1100 may be considered a hybrid processing approach since the some processing is performed partially at a far-edge node 1108, which may correspond to the other far-edge nodes previously discussed, and partially at a near-edge node 1116, which may correspond to the other near-edge nodes previously discussed and some processing is performed entirely at the near-edge node 1116 as will be explained.

As shown, a sensing far-edge node 1102 may generate a data stream 1104 from sensors associated with the sensing far-edge node. In some embodiments, the sensing far-edge node may include some procession resources (i.e., processing resources 209) and so may be able to process some local observations 1106. However, in other embodiments the sensing far-edge node 1102 may not include any processing resources or may only include limited processing resources. Accordingly, the sensing far-edge node 1102 sends the data stream 1104 and/or the local observations 1106 to the near-edge node 1116 for processing as shown at 1124. The near-edge node 1116 then performs 1118 the method steps 1-7 (i.e., method steps 508, 510, 512, optionally 514, 516, and 518) on the information received from the sensing far-edge node 1102 in the manner previously described to generate local environmental information 1126 for the sensing far-edge node 1102.

The far-edge node 1108 may generate a data stream 1110 from sensors associated with the sensing far-edge node in the manner previously described in relation to data stream 506. The far-edge node 1108 then then performs 1112 the method steps 1-7 (i.e., method steps 508, 510, 512, optionally 514, 516, and 518) on the data stream 506 in the manner previously described. The step of filtering 1114 valuable information to be communicated to the near-edge node 1116 is then performed in the manner previously described in relation to the method step 520. The filtered information is provided to the near-edge node 1116 as local environmental information 1128.

The near-edge node 1116 receives the local environmental information 1128 (and other local environmental information from other far-edge nodes) and merges 1120 the local environmental information 1128 with the local environmental information 1126 (and other local environmental information from other sensing far-edge nodes) in the manner previously described in relation to method step 524.

The near-edge node 1116 then updates 1122 the global map in the in the manner previously described in relation to method step 526. The relevant information from the updated global map can then be provided to the far-edge node 1108 and the other far-edge nodes as RoIs 1130 so that the far-edge nodes can update their local maps (i.e., local maps 212) as needed. Likewise, the relevant information from the updated global map can then be provided to the sensing far-edge node 1102 and the other sensing far-edge nodes as RoIs 1132 so that the sensing far-edge nodes can update their local maps (i.e., local maps 207) as needed.

The hybrid processing approach of the method 1100 allows for a balance between the far-edge node and the near-edge node by taking advantage of the far-edge node processing power for processing method steps 1-8 and relying on the near-edge node processing power for processing the method steps 1-7 for those sensing far-edge nodes that are unable to perform this processing themselves. This reduces the processing overhead of the near-edge node. It also mitigates the communication strains between the far-edge nodes and the near-edge node.

Figure 12:
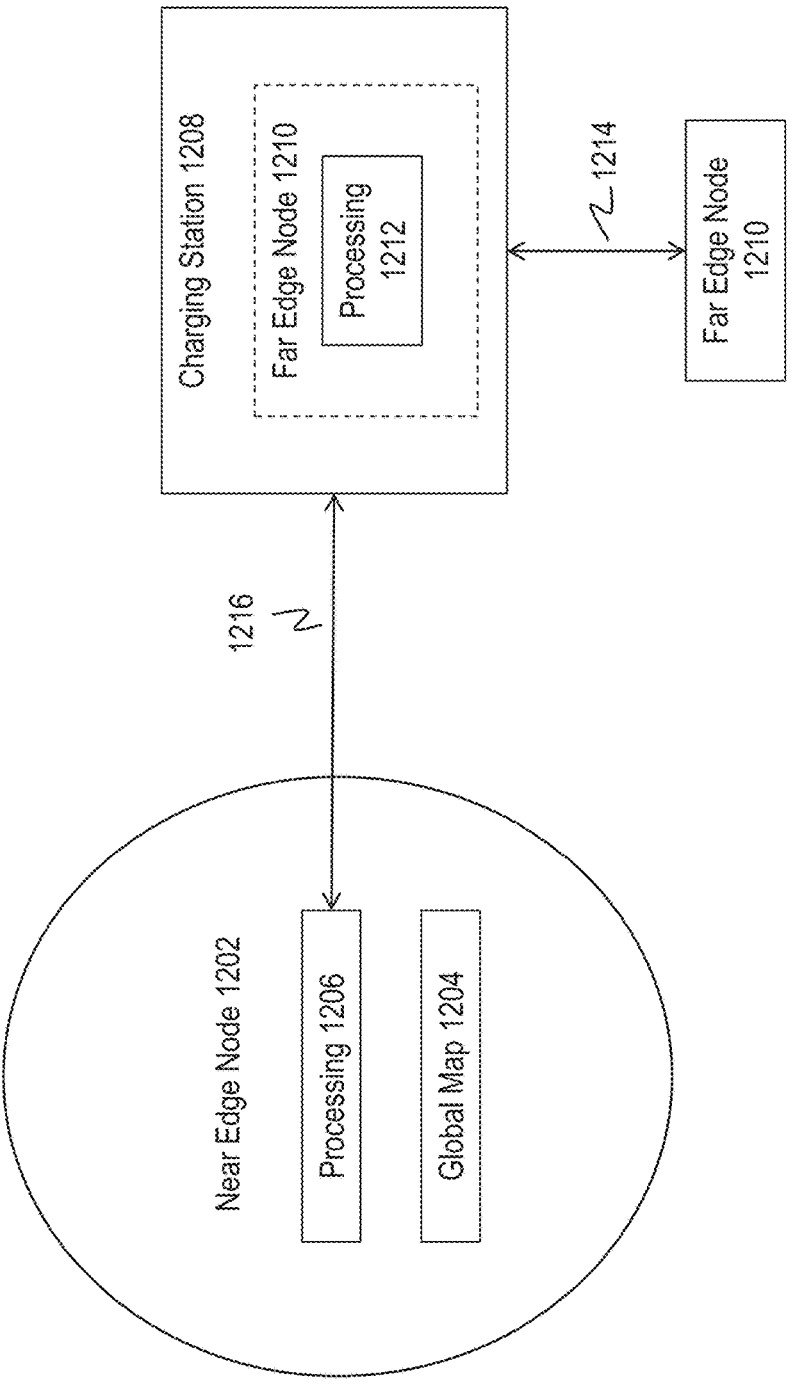
FIG. 12 discloses aspects of integrating processing resources of a far-edge node into processing resources of a near-edge node.

FIG. 12 illustrates an embodiment of an environment 1200 of where far-edge processing resources are integrated, at least temporarily, into the near-edge processing resources. As illustrated, the environment 1200 includes a near-edge node 1202 that includes processing resources 1206 that can be used to update a global map 1204 in the manner previously described.

The environment 1200 also includes a charging station 1208 for charging a far-edge node 1210. As previously described, the far-edge nodes of the present invention may be a mobile and/or autonomous node, such as a robot, a forklift, or the like. Thus, the far-edge nodes may need to be charged from time to time so that they sufficient power to perform their various tasks. Accordingly, as shown at 1214, the far-edge node 1210 is connected to the charging station 1208 for a period of time while being charged. The dashed lines for the far-edge node 1210 inside the charging station 1208 represent that the far-edge node is being charged.

While being charged, the far-edge node 1210 does not perform any tasks, and thus its processing resources 1212, which may correspond to the processing resources 214 are typically idle during that time. In the environment 1200, however, the charging station 1208 is connected to the near-edge node 1202 by a high-speed connection 1216, which may be a high-speed wired connection such as Gigabit Ethernet, although other high-speed connections having sufficient bandwidth to allow the far-edge node 1210 to upload and download information to and from the near-edge node 1202 are also contemplated. Thus, the high-speed connection 1216 allows the processing resources 1212 of the far-edge node 1210 to be integrated into the processing resources 1206 of the near-edge node 1210 while the far-edge node is being charged so as to help perform near-edge processing tasks such as updating the global map 1204. The processing resources 1212 may sign into the processing resources 1206 at when the charging begins and may be given a portion of information to process to update the global map 1204 and then may sign out when the charging process is complete and the far-edge node 1210 is unconnected from the charging station 1208 as also shown at 1214.

Since there may be multiple mobile and/or autonomous far-edge nodes in the environment 1200, especially if the environment is a smart warehouse or the like, there may always be a portion of the far-edge nodes being charged at the charging station 1208 or other similar charging stations. Thus, this embodiment provides the potential to greatly increase the processing power of the near-edge node 1202.

Figure 13A:
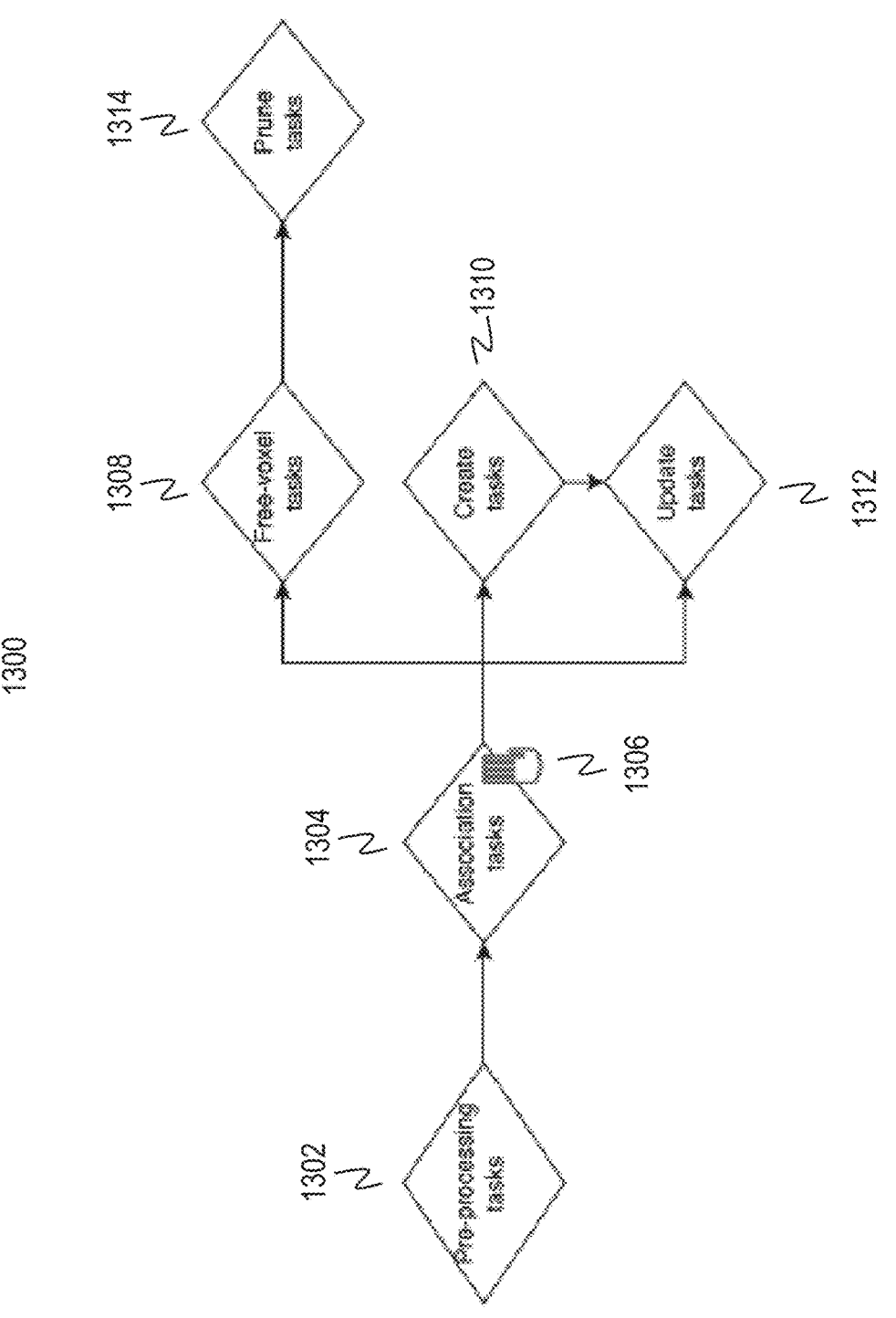
FIGS. 13A and 13B disclose aspects of a resource allocation process.
Figure 13B:
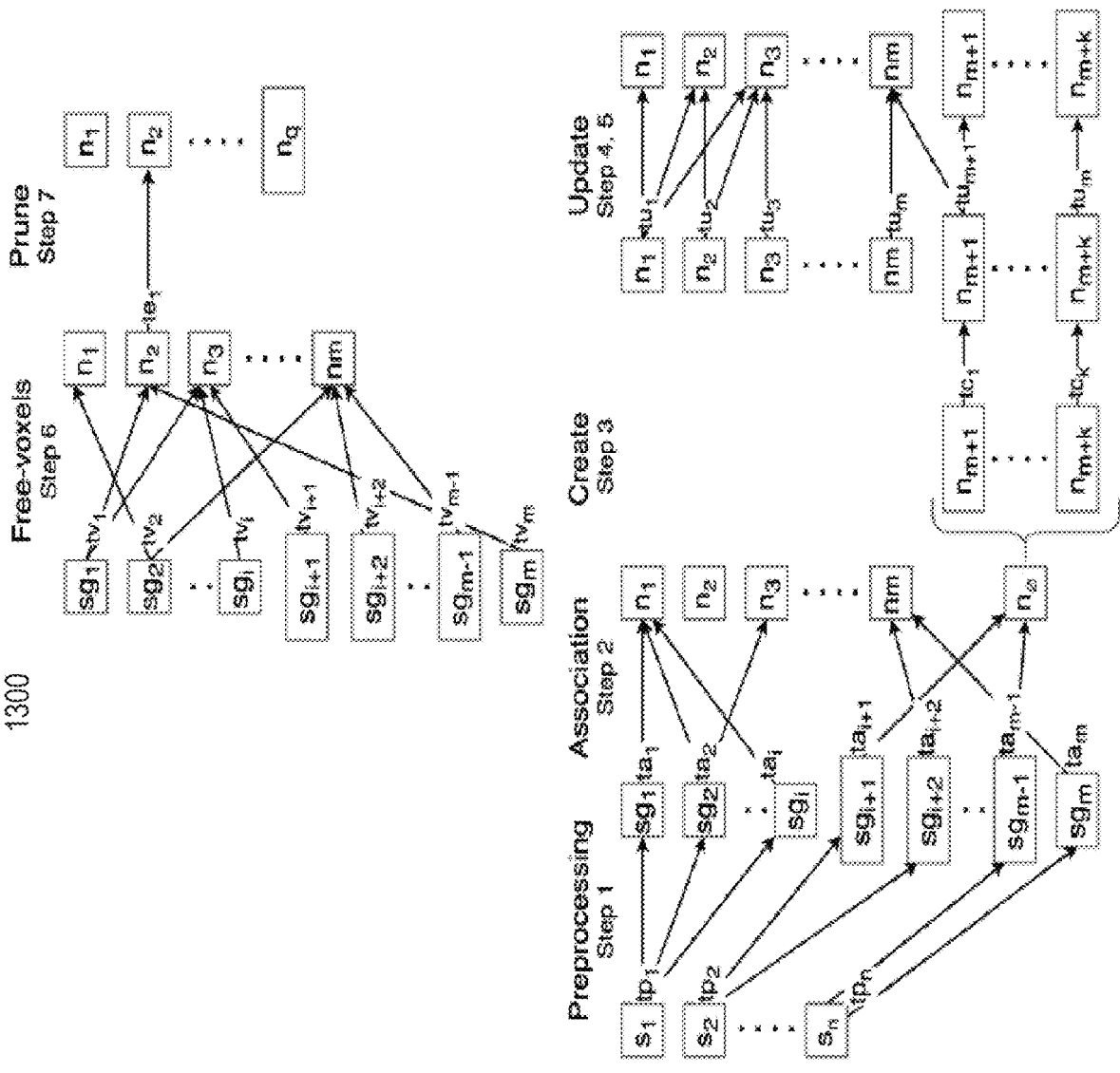

FIGS. 13A and 13B illustrate a resource allocation process 1300 for performing the method steps 1-7 (i.e., method steps 508, 510, 512, 514, 516, and 518) previously described. As shown in FIG. 13A, pre-processing tasks 1302 corresponding to the method step 1 (508) are first performed. Allocation tasks 1304 corresponding to the method step 2 (510) are then performed. The semaphore 1306 is used to indicate that all other tasks can only proceed after the all the pre-processing tasks 1302 and allocation tasks 1304 are completed.

At the completion of the pre-processing tasks 1302 and allocation tasks 1304, the free-voxel tasks 1308, corresponding to the method step 6 (516), the create tasks 1310, corresponding to the method step 3/4 (512), and update tasks 1312, corresponding to the method steps 3/4 (512) and the method step 5 (514) may be performed in parallel as will be explained in relation to FIG. 13B. The prune tasks 1314, corresponding to the method step 7 (518) are performed after the free-voxel tasks 1308.

FIG. 13B describes the resource allocation process 1300 in more detail. Let $s=\{s_1, s_2, \ldots, s_n\}$ be a set of raw measurements respectively provided by each of the n far-edge or sensing nodes as illustrated in the left-hand side of FIG. 13B and $c=\{c_1, c_2, \ldots, c_p\}$ be the set of p available processing units. One pre-processing task $tp_i$ per element in s is allocated to be performed. Therefore, if the algorithm is running on a far-edge node, then there is only a single element in s. Otherwise, the s information is spread in several nodes. Each processing unit receives a single element of s. This means that there is no need to jointly keep in memory all s set, greatly reducing memory resource requirements. The pre-processing task executes method step 1 and extracts m grouped sets of measurements $sg=\{sg_1, sg_2, \ldots, sg_m\}$ from the n sensors, with m>n.

Likewise, the $sg_i$ element can also be provided in reasonably sized batches to a processing unit, greatly reducing the per processing unit memory requirements. All tasks, including the other steps, may use one or more processing units depending on the m, implementation strategy and resource availability.

The resource allocation process 1300 can proceed with association tasks $ta_i$ without having completed all pre-processing tasks. Association tasks compute method step 2 to associate each measurement group element $sg_i$ with a single node in the graph. The SO-map graph nodes are represented in FIG. 13B as the set $n=\{n_1, n_2, \ldots, n_m, n_\varnothing\}$ for clarity of explanation, i.e., although not represented, there is a hierarchy between the nodes. The node no is a temporary placeholder for measurement groups without an association.

A semaphore is used so all other tasks can only proceed after all processing and association tasks are performed. Creation tasks $tc_i$ span measurement groups associated with $n_\varnothing$ to new nodes by performing a method step 3 algorithm. Update tasks must wait all creation tasks to be performed. Each update task performs the method step 4 and 5 for each node in the map in a bottom-up approach. All leaf nodes start as ready to be processed and the non-leaf nodes as not ready. Once all children of a node are processed by update tasks, it is then tagged as ready to be processed.

Aiming at allocation efficiency, the order of the update task allocations may depend on the tree symmetry and how many measurements are associated with each node. A possible approach is to compute the total number of measurements associated with each node as the sum of measurements in its children and within itself. This value can be used to prioritize allocating resources first to nodes where it is expected for the update tasks to take longer to proceed, therefore reducing the potential idle time.

The update of free-voxels as performed by $tv_i$ can be executed in parallel with create and update tasks. They are responsible for the execution of method step 6 and depend on intersections of ray casting operations and the limiting regions of each node. These are performed in a top-down approach. The pruning tasks $te_i$ are performed for each node without associated updates. Hence, they can also be performed in parallel with create and update tasks, but only after each $tv_i$ are completed.

Embodiments of the invention keep a multi-resolution global state of the environment readily available to be provided on-demand and/or processed at the required level-of-detail by leveraging semantic information.

Embodiments of the invention enable resource efficient representation. The proposed representation builds on Octo-Maps and Octree Hierarchy in a manner that reduces resource constraints. Further, information is readily available for processing as parent nodes keep a simpler representation of the environment.

Resource Efficient Representation: the proposed representation builds upon two efficient 3D map solutions: OctoMap and Octree Hierarchy. By addressing their limitations, our invention defines a proper method to reduce resource strains to execute the algorithms in the near-edge node. Consequently, it addresses problems 4.1 and 4.2;

Further, embodiments of the invention support multiple resolutions. Applications requiring higher level-of-detail for determined semantics or nodes can acquire such information by accessing the information on the graph.

Communication is also efficient by mitigating the upload rate or RoIs to far-edge nodes or agents by avoiding the communication of frivolous information.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations.

More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. In a computing system including a far-edge node and a near-edge node, a method for updating a global representation of a graph, the method, comprising: obtaining a set of measurements from one or more nodes in an environment; associating the set of measurements to a node in a local representation of a graph; updating the node in the local representation of the graph associated with the set of measurements with a local update; updating nodes in the local representation of the graph not associated with the node that was updated; generating local environmental information that has been filtered to include information about the nodes in the local representation of the graph that have been updated; sending the local environmental information to the near-edge to be merged with second local environmental information and to be used in updating a global representation of the graph by updating nodes associated with the node that was updated at the far-edge node; and receiving local update information from the near-edge node.

Embodiment 2. The method of embodiment 1, further comprising: at the far-edge node, updating nodes associated with the node that was updated at the far-edge node.

Embodiment 3. The method of embodiment 1 and/or 2, wherein the second local environmental information is generated at the near-edge node from data received from a sensing far-edge node that does not have sufficient processing resources to generate the second local environmental information.

Embodiment 4. The method of embodiment 1, 2, and/or 3, wherein the far-edge nod is one of a moveable far-edge node or a sensing far-edge node.

Embodiment 5. The method of embodiment 4, wherein the moveable far-edge node requires periodic charging, wherein during a charging procedure processing resources of the far-edge node are integrated into processing resources of the near-edge node so that the far-edge node is able to assist the near-edge node in updating the global representation of the graph.

Embodiment 6. The method of embodiment 1, 2, 3, 4, and/or 5, wherein each of the nodes is represented by a sextuplet including a map, a frame of reference, a parent node, a set of child nodes, a label, and an update timestamp.

Embodiment 7. The method of embodiment 1, 2, 3, 4, 5, and/or 6, further comprising pruning the graph of nodes whose likelihood of existing are below a threshold value.

Embodiment 8 The method of embodiment 1, 2, 3, 4, 5, 6, and/or 7, wherein the local update information includes a region of interest.

Embodiment 9. The method of embodiment 1, 2, 3, 4, 5, 6, 7, and/or 8, further comprising creating a node in the graph when the set of measurements are not associated with an existing node in the graph.

Embodiment 10. The method of embodiment 1, 2, 3, 4, 5, 6, 7, 8, and/or 9, wherein updating the node includes verifying that the set of measurements are from a particular object and determining whether the set of measurements are compatible with an existing node in the graph.

Embodiment 11. The method of embodiment 1, 2, 3, 4, 5, 6, 7, 8, 9, and/or 10, further comprising updating parent nodes in a bottom-up approach, updating other nodes in a top-down approach, wherein updating other nodes includes updating freespace voxels.

Embodiment 12. A method for performing any of the operations, methods, or processes, or any portion of any of these, or any combination thereof, disclosed herein.

Embodiment 13. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
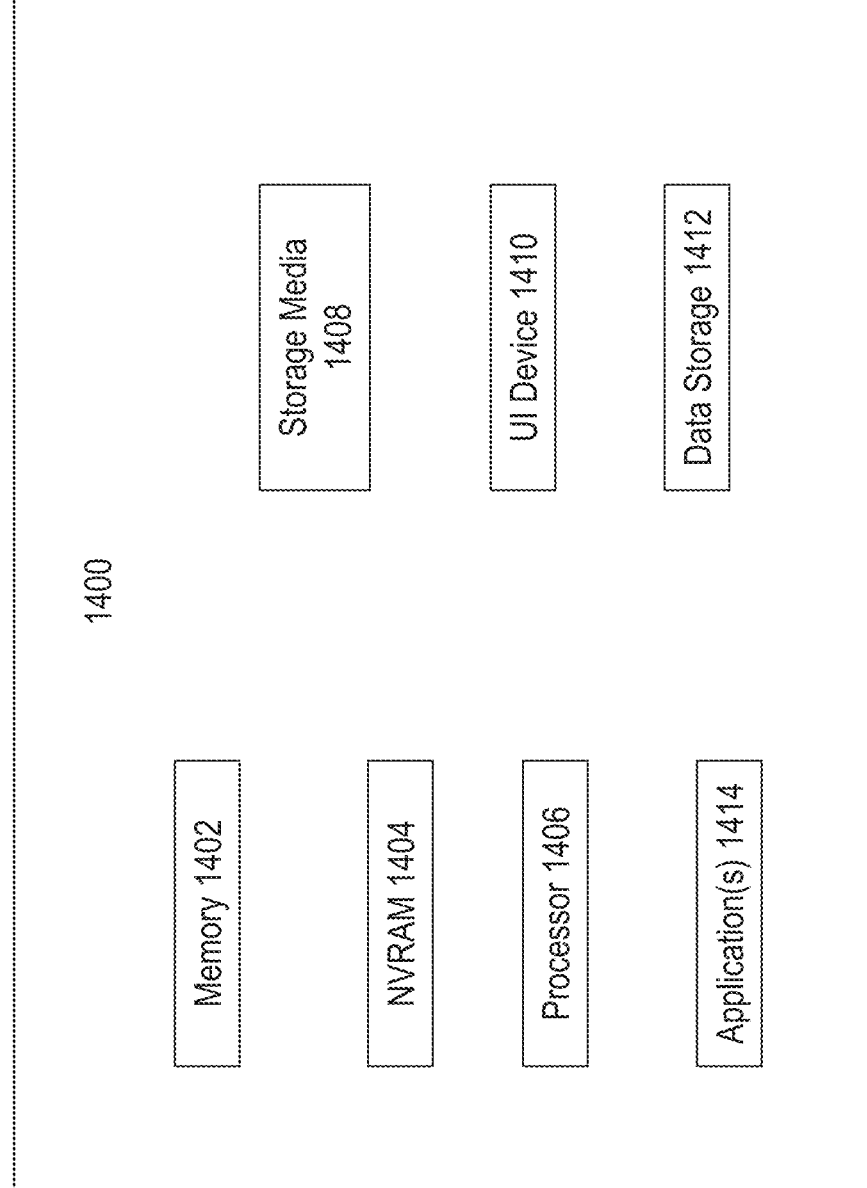
FIG. 14 discloses aspects of a computing device, system, or entity.

With reference briefly now to FIG. 14, any one or more of the entities disclosed, or implied, by the Figures and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI device 1410, and data storage 1412. One or more of the memory components 1402 of the physical computing device 1400 may take the form of solid-state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system including a far-edge node and a near-edge node, a method comprising:

obtaining a set of measurements and interactions at a far-edge node in an environment, wherein the far-edge node is one of a moveable far-edge node or a sensing far-edge node, wherein a plurality of far-edge nodes are present in the environment and each is associated with a different set of measurements, wherein the interactions include relationships between the far-edge node and objects in the environment;

associating the set of measurements and the interactions to a graph node in a local representation of a local graph at the far-edge node, wherein the local graph is a portion of a global graph, wherein each of the far-edge nodes and objects in the environment are represented in the global graph;

updating the graph node in the local representation of the local graph associated with the set of measurements and the interactions with a local update, wherein updating the graph node includes updating graph node relationships based on the interactions, wherein updating graph node relationships may include creating a parent-child relationship in the local graph when the far-edge node begins an interaction with an object or a second far-edge node and pruning a child node in the local graph when the interaction with the object or the second far-edge node ends;

updating other graph nodes in the local representation of the graph not associated with the graph node that was updated, wherein the other graph nodes are associated with other far-edge nodes included in the plurality of far-edge nodes;

generating local environmental information that has been filtered to include information about the far edge nodes included in the local representation of the local graph that have been updated;

sending the local environmental information to the near-edge node to be merged with second local environmental information received the plurality of far-edge nodes and to be used in updating a global representation of a global graph by updating graph nodes in the global graph based on the local environmental information and the second local environment information; and receiving local update information from the near-edge node at the far-edge node; and updating the local representation of the local graph at the far-edge node with the local update information received from the near-edge node.

2. The method of claim 1, further comprising:

at the far-edge node, updating graph nodes associated with the graph node that was updated at the far-edge node.

3. The method of claim 1, wherein the moveable far-edge node undergoes a periodic charging procedure, wherein during the periodic charging procedure processing resources of the far-edge node are integrated into processing resources of the near-edge node so that the far-edge node is able to assist the near-edge node in updating the global representation of the global graph.

4. The method of claim 1, wherein each of the graph nodes is represented in its minimal form by a sextuplet including a map, a frame of reference, a parent node, a set of child nodes, a label, and an update timestamp.

5. The method of claim 1, further comprising pruning, at the far-edge node, graph nodes in the local representation of the local graph whose likelihood of existing are below a threshold value or based on the interactions.

6. The method of claim 1, wherein the local update information includes a region of interest.

7. The method of claim 1, further comprising creating, at the far-edge node, a graph node in the local representation of the graph when the set of measurements are not associated with an existing graph node in the local representation of the local graph based on the interactions, wherein the interactions are represented at least semantically.

8. The method of claim 1, wherein updating the graph node includes verifying that the set of measurements are from a particular semantic class and determining whether the set of measurements are compatible with an existing graph node in local representation of the local graph.

9. The method of claim 1, further comprising updating parent nodes in a bottom-up approach, updating other nodes in a top-down approach, wherein updating other nodes includes updating freespace voxels at the far-edge node.

10. A non-transitory storage medium having stored therein instructions that are executable by one or more hardware processors to perform operations comprising:

Obtaining a set of measurements and interactions at a far-edge node in an environment, wherein the far-edge node is one of a moveable far-edge node or a sensing far-edge node, wherein a plurality of far-edge nodes are present in the environment and each is associated with a different set of measurements, wherein the interactions include relationships between the far-edge node and objects in the environment;

associating the set of measurements and the interactions to a graph node in a local representation of a local graph at the far-edge node, wherein the local graph is a portion of a global graph, wherein each of the far-edge nodes and objects in the environment are represented in the global graph;

updating the graph node in the local representation of the local graph associated with the set of measurements and the interactions with a local update, wherein updating the graph node includes updating graph node relationships based on the interactions, wherein updating graph node relationships may include creating a parent-child relationship in the local graph when the far-edge node begins an interaction with an object or a second far-edge node and pruning a child node in the local graph when the interaction with the object or the second far-edge node ends;

updating other graph nodes in the local representation of the graph not associated with the graph node that was updated, wherein the other graph nodes are associated with other far-edge nodes included in the plurality of far-edge nodes;

generating local environmental information that has been filtered to include information about the far edge nodes included in the local representation of the local graph that have been updated;

sending the local environmental information to the near-edge node to be merged with second local environmental information received the plurality of far-edge nodes and to be used in updating a global representation of a global graph by updating graph nodes in the global graph based on the local environmental information and the second local environment information; and receiving local update information from the near-edge node at the far-edge node; and updating the local representation of the local graph at the far-edge node with the local update information received from the near-edge node.

11. The non-transitory storage medium of claim 10, further comprising:

at the far-edge node, updating graph nodes associated with the graph node that was updated at the far-edge node.

12. The non-transitory storage medium of claim 10, wherein the moveable far-edge node undergoes a periodic charging procedure, wherein during the periodic charging procedure processing resources of the far-edge node are integrated into processing resources of the near-edge node so that the far-edge node is able to assist the near-edge node in updating the global representation of the global graph.

13. The non-transitory storage medium of claim 10, wherein each of the graph nodes is represented in its minimal form by a sextuplet including a map, a frame of reference, a parent node, a set of child nodes, a label, and an update timestamp.

14. The non-transitory storage medium of claim 10, further comprising pruning, at the far-edge node, graph nodes in the local representation of the local graph whose likelihood of existing are below a threshold value or based on the interactions.

15. The non-transitory storage medium of claim 10, further comprising creating at the far-edge node a node in the local representation of the graph when the set of measurements are not associated with an existing node in the local representation of the graph based on the interactions, wherein the interactions are represented at least semantically.

16. The non-transitory storage medium of claim 10, wherein the local update information includes a region of interest.

17. The non-transitory storage medium of claim 10, further comprising updating parent nodes in a bottom-up approach, updating other nodes in a top-down approach, wherein updating other nodes includes updating freespace voxels at the far-edge node.

18. In a computing system including a far-edge node and a near-edge node, a method comprising:

at the far-edge node:

obtaining a set of measurements and interactions from the far-edge node in an environment, wherein the far-edge node is one of a moveable far-edge node or a sensing far-edge node, wherein the interactions include relationships between the far-edge node and objects in the environment, wherein a plurality of far-edge nodes are present in the environment and each is associated with a set of measurements;

associating the set of measurements and the interactions to a graph node in a local representation of a local graph, wherein each of the far-edge nodes and objects in the environment are represented in the global graph;

updating the graph node in the local representation of the local graph associated with the set of measurements and the interactions with a local update, wherein updating the graph node includes updating graph node relationships based on the interactions, wherein updating graph node relationships may include creating a parent-child relationship in the local graph when the far-edge node begins an interaction with an object or a second far-edge node and pruning a child node in the local graph when the interaction with the object or the second far-edge node ends;

updating graph nodes in the local representation of the local graph not associated with the graph node in the local graph that was updated; and generating local environmental information that has been filtered to include information about the graph nodes in the local representation of the local graph that have been updated; and at the near-edge node:

merging the local environmental information received from the far-edge node with second local environmental information received other far-edge nodes or generated at the near-edge node; and updating a global representation of a global graph by updating graph based on the local environmental information and the second local environmental information.

* * * * *